US010513794B2

(12) United States Patent
Yan et al.

(10) Patent No.: US 10,513,794 B2
(45) Date of Patent: Dec. 24, 2019

(54) MULTILAYERED SULFUR COMPOSITE CATHODES FOR LITHIUM SULFUR BATTERIES

(71) Applicant: West Virginia University, Morgantown, WV (US)

(72) Inventors: Jianhua Yan, Morgantown, WV (US); Bingyun Li, Morgantown, WV (US); Xingbo Liu, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 793 days.

(21) Appl. No.: 14/960,998

(22) Filed: Dec. 7, 2015

(65) Prior Publication Data

US 2016/0172667 A1    Jun. 16, 2016

Related U.S. Application Data

(60) Provisional application No. 62/090,654, filed on Dec. 11, 2014.

(51) Int. Cl.
*H01M 4/66* (2006.01)
*C25D 13/22* (2006.01)
(Continued)

(52) U.S. Cl.
CPC .......... *C25D 13/22* (2013.01); *H01M 4/0404* (2013.01); *H01M 4/136* (2013.01);
(Continued)

(58) Field of Classification Search
CPC .. H01M 4/0404; H01M 4/136; H01M 4/1397; H01M 4/663; H01M 4/667; H01M 4/366
See application file for complete search history.

(56) References Cited

U.S. PATENT DOCUMENTS

2006/0249202 A1    11/2006    Yoo et al.
2013/0115527 A1    5/2013    Au
(Continued)

FOREIGN PATENT DOCUMENTS

WO    2014031440    2/2014

OTHER PUBLICATIONS

Kim et al., PANI-coated sulfur-carbon nanotube composite shows long cycle life for high-capacity Li—S batteries, Mar. 14, 2015, Green Car Congress, 2 pgs (Year: 2015).*
Zang, Y et al., "A novel lithium/sulfur battery based on sulfur/graphene nanosheet composite cathode and gel polymer electrolyte" Mar. 21, 2014; Nanoscale Research Letters 2014, 9:137;online retrieved on Jan. 21, 2016. http://www. nanoscaleslett.com/content/9/1/137.
(Continued)

*Primary Examiner* — Ula C Ruddock
*Assistant Examiner* — Thomas H. Parsons
(74) *Attorney, Agent, or Firm* — Buchanan Ingersoll & Rooney PC; Craig G. Cochenour, Esq.

(57) ABSTRACT

A multilayered cathode for a lithium sulfur battery comprising at least one current collector working electrode having a surface comprising a carbon containing layer, two or more sulfur containing layers wherein at least one of the sulfur layers is located in juxtaposition to and in communication with the carbon containing layer, and at least one outermost layer comprising a positively charged polymer for forming interconnected layers of the sulfur containing layer, the carbon containing layer, and the polymer. Preferably, the cathode has layers that are alternatively arranged of two or more different sulfur containing layers. A lithium sulfur battery is provided and a method of making a multilayered cathode for a lithium sulfur battery is disclosed.

16 Claims, 23 Drawing Sheets

(51) Int. Cl.
*H01M 10/052* (2010.01)
*H01M 4/04* (2006.01)
*H01M 4/136* (2010.01)
*H01M 4/1397* (2010.01)
*H01M 4/62* (2006.01)
*H01M 4/36* (2006.01)

(52) U.S. Cl.
CPC ........... *H01M 4/1397* (2013.01); *H01M 4/62* (2013.01); *H01M 4/661* (2013.01); *H01M 4/663* (2013.01); *H01M 4/667* (2013.01); *H01M 10/052* (2013.01); *H01M 4/366* (2013.01)

(56) References Cited

U.S. PATENT DOCUMENTS

| | | |
|---|---|---|
| 2014/0162118 A1 | 6/2014 | Chu et al. |
| 2014/0234707 A1 | 8/2014 | Muldoon et al. |
| 2014/0342227 A1* | 11/2014 | Hasenkox ........... H01M 4/0404 429/218.1 |
| 2016/0104554 A1* | 4/2016 | Zhong .................... B29C 41/12 264/425 |

OTHER PUBLICATIONS

International Search Report and Written Opinion for PCT/US15/64263 filed Dec. 7, 2015; dated Feb. 16, 2016.

\* cited by examiner

MULTILAYERED SULFUR COMPOSITE CATHODES FOR LITHIUM SULFUR BATTERIES

CROSS REFERENCE TO RELATED APPLICATION

This utility patent application claims the benefit of priority to U.S. Provisional Patent Application Ser. No. 62/090,654, filed Dec. 11, 2014. The entire contents of U.S. Provisional patent Application Ser. No. 62/090,654 are incorporated by reference into this utility patent application as if fully rewritten herein.

BACKGROUND OF THE INVENTION

1. Field of the Invention

This invention relates to a multilayered cathode for lithium sulfur batteries. Specifically, this invention provides a multilayered sulfur composite/compound cathode for a lithium sulfur battery, methods to prepare the multilayered sulfur composite/compound cathode, and a lithium sulfur battery having the cathode.

2. Brief Description of the Background Art

Lithium sulfur batteries (LSBs) suffer from problems like severe capacity fading and low power density due to high solubility of intermediate polysulfides and low conductivity of sulfur. Various sulfur composites including sulfur carbons and sulfur polymers have been reported, aiming to achieve fast reaction kinetics and effective trapping of soluble polysulfides. Unfortunately, these batteries have their own limitations, none of them could resolve the above two challenges. The best way to improve the performances of rechargeable LSBs is to reduce the dissolution of intermediate polysulfides while provide an excellent ionic- and electric-conductive network.

SUMMARY OF THE INVENTION

Considering the advantages of multilayered cathodes including (1) high energy densities; (2) high power densities and (3) longer cyclic lifetimes, the present invention provides multilayered sulfur composite cathodes containing at least two kinds of carbon materials- (functionalized, but not limit to) or polymer materials- (with surface functional groups, but not limit to) based sulfur composites or sulfur compounds. The novelty of this invention lies mainly in the development and application of a new kind of multilayered cathode for lithium sulfur batteries. In this invention, new sulfur based composite multilayered cathodes are prepared via highly efficient (1) layer-by-layer (LbL) method, (2) step-by-step electrophoretic deposition (EPD) method, (3) spin-assisted assembly technique and (4) alternately misting method. The advantages of the methods of the present invention are (1) cost effectiveness, (2) simplicity, and (3) eco-friendly manufacturing. This invention provides multilayered cathodes containing alternatively arranged two or more different sulfur composite/compound layers with porous structures produced by binder free highly cross-linked selected materials.

An embodiment of this invention provides a multilayered cathode for a lithium sulfur battery comprising at least one current collector working electrode having a surface comprising a carbon containing layer, two or more sulfur containing layers wherein at least one of said sulfur layers is located in juxtaposition to and in communication with the carbon containing layer, and at least one outermost layer comprising a positively charged polymer for forming interconnected layers of the sulfur containing layer, the carbon containing layer, and the polymer, wherein the outermost layer is in juxtaposition to and in communication with at least one of the sulfur layers. The multilayered cathode of this invention preferably includes wherein the carbon containing layer comprises a carbon nanotube —COO$^-$ moiety. The multilayered cathode of this invention comprising alternatively arranged layers of the sulfur containing layers wherein the sulfur containing layers comprise one or more sulfur containing compounds and one or more sulfur-carbon-polymer composites. Preferably, the multilayered cathode of this invention includes wherein the layers have porous cross-linked structures.

Another embodiment of this invention provides the multilayered cathode, as described herein, wherein at least one of the sulfur containing layers is a sulfur-carbon nanotube polystyrene sulfonate polymer.

Another embodiment of this invention provides the multilayered cathode, as described herein, wherein the outermost layer of the positively charged polymer is a sulfur polyaniline polymer.

In yet another embodiment of this invention, a lithium sulfur battery is disclosed having at least one multilayered cathode and at least one anode, wherein the multilayered cathode comprises at least one current collector working electrode having a surface comprising a carbon containing layer; two or more sulfur containing layers wherein at least one of the sulfur layers is located in juxtaposition to and in communication with the carbon containing layer; and at least one outermost layer comprising a positively charged polymer for forming interconnected layers of the sulfur containing layer, the carbon containing layer, and the polymer, wherein the outermost layer is in juxtaposition to and in communication with at least one of the sulfur layers. Preferably, the lithium sulfur battery, as described herein, includes wherein the carbon containing layer of the multilayered cathode comprises a carbon nanotube —COO$^-$ moiety (i.e. an example of a functionalized carbon nanotube). Most preferably, the lithium sulfur battery of this invention, as described herein, includes wherein the multilayered cathode comprises alternatively arranged layers of the sulfur containing layers wherein the sulfur containing layers comprise one or more sulfur containing compounds and one or more sulfur-carbon-polymer composites.

Another embodiment of this invention provides a lithium sulfur battery, as described herein, including wherein the layers of the multilayered cathode have porous cross-linked structures.

Another embodiment of this invention provides a lithium sulfur battery, as described herein, includes wherein at least one of the sulfur containing layers of the multilayered cathode is a sulfur-carbon nanotube polystyrene sulfonate polymer.

Another embodiment of this invention provides a lithium sulfur battery, as described herein, including wherein the outermost layer of the positively charged polymer of the multilayered cathode is a sulfur polyaniline polymer.

In yet another embodiment of this invention, a method of making a multilayered cathode for a lithium sulfur battery is provided. This method of making a multilayered cathode for a lithium sulfur battery comprises employing at least one of the methods selected from the group consisting of (1) a layer-by-layer (LbL) method, (2) a step-by-step electrophoretic deposition (EPD) method, (3) a spin-assisted assembly technique, and (4) an alternately misting method, to produce a multilayered sulfur composite cathode.

Preferably, the method for making a multilayered cathode for a lithium battery comprises (a) providing a sulfur carbon nanotube polystrenesulfonate composition dispersed in water for forming a sulfur carbon nanotube polystyrene dispersion; (b) providing a sulfurized polyaniline composition dispersed in water for forming a sulfurized polyaniline dispersion; (c) providing a current collector having a surface comprising a carbon coating; (d) immersing the current collector having the carbon coating into the sulfurized polyaniline dispersion to form a sulfurized polyaniline coated current collector; and (e) immersing the sulfurized polyaniline coated current collector into the sulfur carbon nanotube polystyrene dispersion for forming one layer of the sulfurized polyaniline and the sulfur carbon nanotube polystyrenesulfonate treated current collector; and (f) repeating the steps (d) and (e) one or more times to form one or more additional layers of the sulfurized polyaniline and the sulfur carbon nanotube polystyrenesulfonate upon the treated current collector. This method includes wherein the carbon coating comprises one or more of a functionalized porous carbon, graphite, grapheme, carbon nanoparticles, carbon nanotubes, carbon fibers, and carbon rods. The functionalized porous carbon is a carbon nanotube functionalized with a $COO^-$ group to form a carbon nanotube $COO^-$. This method preferably includes wherein the current collector is one or more selected from the group consisting of an aluminum substrate, a copper substrate, a nickel substrate, and a conductive glass.

BRIEF SUMMARY OF THE DRAWINGS

FIG. 3a shows an SEM image of low magnification (magnification level: ×2000) and FIG. 3b high magnification (magnification level: ×10000) for the EPD-grown (electrophoretic deposition grown) carbon nanofiber anodes of this invention.

FIG. 4a shows cyclic properties of multilayered cathodes at various current densities; capacities were calculated based on the whole materials' weight on cathodes. FIG. 4b shows cyclic properties of multilayered cathodes for cycles up to 420 at a current density of 550 $mAg^{-1}$. FIG. 4c shows the voltage profiles of discharge/charge cycles of first and fiftieth cycles of Li/S cells at a current density of 1300 $mAg^{-1}$ and 1950 $mAg^{-1}$, respectively.

FIG. 5a is a schematic diagram of multilayered cathode of this invention fabricated by the LbL process and the functions of each component. FIG. 5b is a schematic diagram of the self-control polyshuttle process in the multilayered cathode.

DETAILED DESCRIPTION OF THE INVENTION

Figure 1:
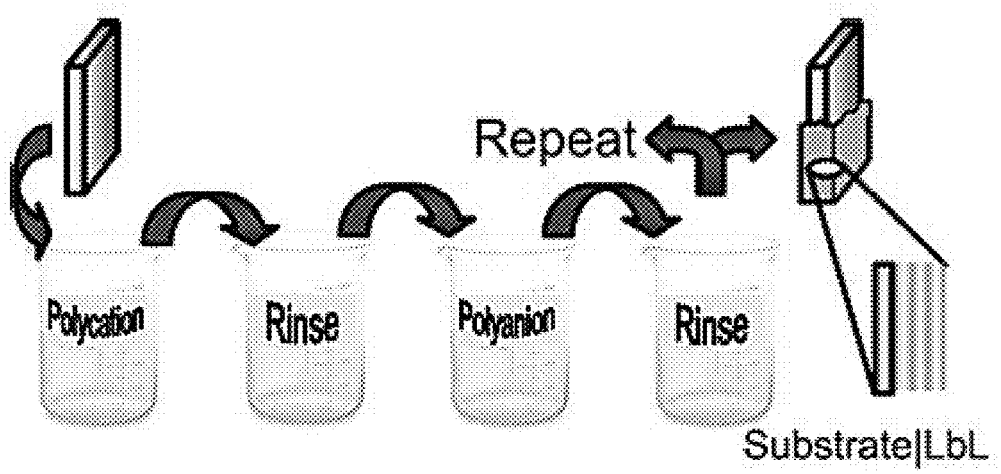
FIG. 1 shows a schematic of one embodiment of the method of this invention for preparation of a multilayered sulfur composite cathode employing the LbL method. The aluminum substrate was treated with negative charges before the LbL method.
Figure 2:
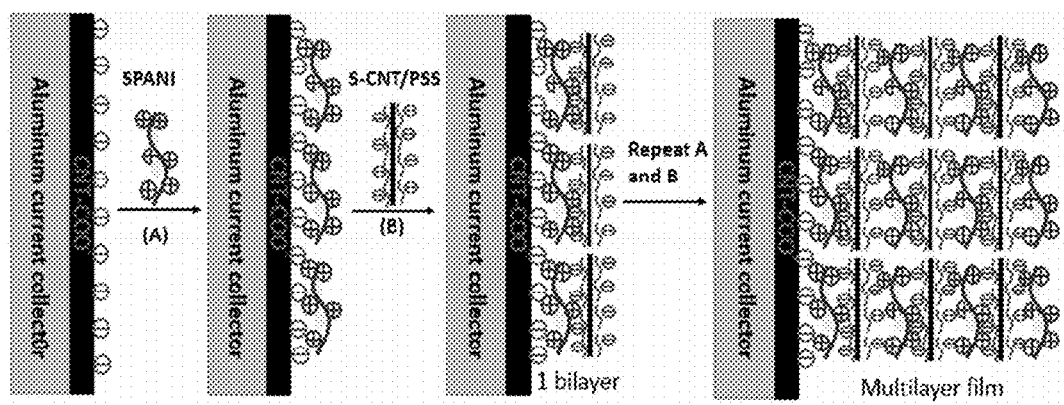
FIG. 2 shows a schematic of one embodiment of the method of this invention for preparation of a multilayered sulfur composite cathode of this invention employing the LbL method.

The present invention provides multilayered sulfur composite cathodes containing sulfur composites or sulfur compounds. The present application provides a process for making a multilayered cathode for lithium sulfur batteries. In this invention, new sulfur based composite multilayered cathodes are prepared via highly efficient (1) layer-by-layer (LbL) method, (2) step-by-step electrophoretic deposition (EPD) method, (3) spin-assisted assembly technique and (4) alternately misting method. The advantages of the methods of the present invention are (1) cost effectiveness, (2) simplicity, and (3) eco-friendly manufacturing. This invention provides multilayered cathodes containing alternatively arranged two or more different sulfur composite/compound layers with porous structures produced by binder free highly crosslinked selected materials.

An embodiment of this invention provides a multilayered cathode for a lithium sulfur battery comprising at least one current collector working electrode having a surface comprising a carbon containing layer, two or more sulfur containing layers wherein at least one of said sulfur layers is located in juxtaposition to and in communication with the carbon containing layer, and at least one outermost layer comprising a positively charged polymer for forming interconnected layers of the sulfur containing layer, the carbon containing layer, and the polymer, wherein the outermost layer is in juxtaposition to and in communication with at least one of the sulfur layers. The multilayered cathode of this invention preferably includes wherein the carbon containing layer comprises a carbon nanotube —$COO^-$ moiety. The multilayered cathode of this invention comprising alternatively arranged layers of the sulfur containing layers wherein the sulfur containing layers comprise one or more sulfur containing compounds and one or more sulfur-carbon-polymer composites. Preferably, the multilayered cathode of this invention includes wherein the layers have porous cross-linked structures.

Another embodiment of this invention provides the multilayered cathode, as described herein, wherein at least one of the sulfur containing layers is a sulfur-carbon nanotube polystyrene sulfonate polymer.

Another embodiment of this invention provides the multilayered cathode, as described herein, wherein the outermost layer of the positively charged polymer is a sulfur polyaniline polymer.

In yet another embodiment of this invention, a lithium sulfur battery is disclosed having at least one multilayered cathode and at least one anode, wherein the multilayered cathode comprises at least one current collector working electrode having a surface comprising a carbon containing layer; two or more sulfur containing layers wherein at least one of the sulfur layers is located in juxtaposition to and in communication with the carbon containing layer; and at least one outermost layer comprising a positively charged polymer for forming interconnected layers of the sulfur containing layer, the carbon containing layer, and the polymer, wherein the outermost layer is in juxtaposition to and in communication with at least one of the sulfur layers. Preferably, the lithium sulfur battery, as described herein, includes wherein the carbon containing layer of the multilayered cathode comprises a carbon nanotube —$COO^-$ moiety (i.e. an example of a functionalized carbon nanotube). Most preferably, the lithium sulfur battery of this invention, as described herein, includes wherein the multilayered cathode comprises alternatively arranged layers of the sulfur containing layers wherein the sulfur containing layers comprise one or more sulfur containing compounds and one or more sulfur-carbon-polymer composites.

Another embodiment of this invention provides a lithium sulfur battery, as described herein, including wherein the layers of the multilayered cathode have porous cross-linked structures.

Another embodiment of this invention provides a lithium sulfur battery, as described herein, includes wherein at least one of the sulfur containing layers of the multilayered cathode is a sulfur-carbon nanotube polystyrene sulfonate polymer.

Another embodiment of this invention provides a lithium sulfur battery, as described herein, including wherein the outermost layer of the positively charged polymer of the multilayered cathode is a sulfur polyaniline polymer.

In yet another embodiment of this invention, a method of making a multilayered cathode for a lithium sulfur battery is provided. This method of making a multilayered cathode for a lithium sulfur battery comprises employing at least one of the methods selected from the group consisting of (1) a layer-by-layer (LbL) method, (2) a step-by-step electrophoretic deposition (EPD) method, (3) a spin-assisted assembly technique, and (4) an alternately misting method, to produce a multilayered sulfur composite cathode.

Preferably, the method for making a multilayered cathode for a lithium battery comprises (a) providing a sulfur carbon nanotube polystrenesulfonate composition dispersed in water for forming a sulfur carbon nanotube polystyrene dispersion; (b) providing a sulfurized polyaniline composition dispersed in water for forming a sulfurized polyaniline dispersion; (c) providing a current collector having a surface comprising a carbon coating; (d) immersing the current collector having the carbon coating into the sulfurized polyaniline dispersion to form a sulfurized polyaniline coated current collector; and (e) immersing the sulfurized polyaniline coated current collector into the sulfur carbon nanotube polystyrene dispersion for forming one layer of the sulfurized polyaniline and the sulfur carbon nanotube polystyrenesulfonate treated current collector; and (f) repeating the steps (d) and (e) one or more times to form one or more additional layers of the sulfurized polyaniline and the sulfur carbon nanotube polystyrenesulfonate upon the treated current collector. This method includes wherein the carbon coating comprises one or more of a functionalized porous carbon, graphite, grapheme, carbon nanoparticles, carbon nanotubes, carbon fibers, and carbon rods. The functionalized porous carbon is a carbon nanotube functionalized with a $COO^-$ group to form a carbon nanotube $COO^-$. This method preferably includes wherein the current collector is one or more selected from the group consisting of an aluminum substrate, a copper substrate, a nickel substrate, and a conductive glass.

While described in more detail below, one embodiment of this invention employs a LbL technique to fabricate the multilayered sulfur cathodes. First, we prepared two kinds of uniform dispersions with opposite charges. The first one was PANI/SPANI (SPANI) that with positive charges in the de-ionic water dispersion. The second one was functionalized carbon nanotube and sulfur composites that coating with a thin layer of PSS (S-CNT/PSS) in the de-ionic water dispersion. Second, the multilayered cathodes were fabricated on aluminum current collectors by alternate adsorption of negatively charged S-CNT/PSS and positively charged SPANI. Third, the multilayered cathodes were heated at vacuum oven at 95° C. (Centigrade) for 5 h (hours). The fabrication process is shown in FIG. 1. FIG. 1 sets forth a schematic illustration for the preparation of multilayered sulfur composite cathodes by LbL. The aluminum substrate was treated with negative charges before LbL process.

One use for the process of this invention is in the film fabrication for lithium sulfur batteries. Another use for the process of this invention is for carbon silicon composite anode fabrication.

This invention solves the problems associated with current known technology. The present invention mitigates the capacity fading and low power density problems that exist in sulfur cathodes as part of lithium sulfur batteries. The multilayered cathodes of this invention may be used for lithium sulfur batteries to provide great power and energy densities, stable cycling performances and low costs.

The multilayered cathodes of this invention produce synergistic effects from the intimate contact between the selected components and lead to improved sulfur cathodes for LSBs. First, the multilayered cathodes of this invention have increased power density of LSBs. Since sulfur cathodes involve multi-step reaction, Li— ion and electron transport is an important factor. Li-ion transport within a binder-free multilayered film may be selectively tuned through the creation of a nanoporous network. The empty pores act as reservoirs for liquid electrolytes capable of fast Li-ion conduction. Meanwhile, the highly cross-linked SPAN1 and CNT facilitate electrical conductivity and, to a lesser extent, Li-ion transport. Second, the multilayered cathodes of this invention have improved energy density of LSBs. The control of cathode structure ensures a homogeneously sulfur distribution in discrete layers, which provide huge reactive interfacial areas that allow convenient incorporation and manipulation of sulfur into the selected layers. While the multilayers-electrolyte interfaces may be tuned, enhancing electronic and ionic conduction across the interfaces and thus leading to a maximization efficiency of sulfur. Third, the multilayered cathodes of this invention effectively block polysulfide anions while the active material's functions and properties remain unaltered and ionic/electronic transfer limitations are eliminated. The positive charges on SPANI interact with polysulfide anions and reduce their dissociation from the multilayered structure. The PSS polymers form dense protective films to trap polysulfides. On the other hand, the SPANI and functionalized CNTs incorporated within the multilayered structure serve as chemical reaction sites for sulfur and intermediate polysulfides to ensure a more complete redox process. The structure allows for reversible in situ deposition of intermediate polysulfide species during discharge and their corresponding transformation during charge within the homogeneous functional group matrices, which further attract polysulfide anions from "leaking" of the multilayered cathodes. Fourth, the multilayered cathodes enhance stability of LSBs. The porous structure yields the mechanical properties, which accommodate the volume change and the corresponding strains accumulated in the cathodes. In addition, the SPANI shows great electrochemical performances that stabilize the multilayered cathodes.

In one embodiment of this invention, the multilayered sulfur composite cathode of this invention, (1) sulfur is combined with carbon or polymer to form sulfurized carbon, sulfurized polymer, carbon sulfur composite and polymer sulfur composite.
   (a) The carbon material species include functionalized-porous carbon, graphite, graphene, carbon nanoparticles, carbon nanotubes, carbon fibers, or carbon rods.
   (b) The polymers include polyaniline (PANI), polystyrene sulfonate (PSS), poly (ethylene oxide) (PEO), polyethylene glycol) (PEG).

(2) The current collector includes aluminum grid, aluminum foil, aluminum foam, copper foil, nickel foil and conductive glass.

(3) The alternative layers could include sulfur composite/compound or other polymers without sulfur.

(4) The multilayered sulfur composite cathodes may be fabricated by (a) LbL technique; (b) step-by-step electrophoretic deposition (EPD) method; (c) spin-assisted assembly technique, or a (d) an alternately misting method (4a-d are procedures well known by those persons skilled in the art).

(5) The post-heated temperature for the multilayered sulfur cathodes is not limited to 95° C. and the heated time is not limited to 10 h.

It is known by those skilled in the art that LSB suffers from incomplete reduction of elemental sulfur to lithium sulfide, severe capacity fading, and low power density during multiple cycles, mainly originating from the inherent challenges of its chemistry.[*1] One of the challenges is related to the multi-step electrochemical reactions from $S_8$ to $Li_2S$ where the intermediate polysulfides can easily dissolve into liquid electrolytes, and this results in the so-called polysulfide shuttle effects: the dissolved polysulfides diffuse to the Li anode where they get reduced and then diffuse back to the sulfur cathode.[*2] During these parasitic shuttle processes, the active material is irreversibly consumed and nonconductive sulfur crystals are accumulated, leading to decreased capacity retention. Meanwhile, the changes in cathode morphology induces strain inside the electrode and the passivation of Li anode leads to an increase in impedance barrier, both of which also reduce the cyclic lives of batteries.[*3,*4] A second challenge for LSBs is that the ionic and electric insulating sulfur and low-order polysulfides (LPS, i.e. $Li_2S_n$, n≤3) can result in low energy and power density. The complete conversion of $S_8$ to $Li_2S$ is difficult since even a thin layer of LSP covering on the surface of cathode can greatly inhibit lithiation and lead to rapid voltage decrease.[*5,*6,*7] Another challenge for LSBs is their high volume change during cycling, which results in electrical isolation of active materials and therefore, fast capacity decay during multiple cycles.[*8]

The multilayered cathodes of the present invention produced synergistic effects from the intimate contact between the selected components and led to improved sulfur cathodes for LSBs. First, the multilayered cathodes of the present invention increased power density of LSBs. Since sulfur cathodes involve multi-step reaction, Li-ion and electron transport is an important factor. Li-ion transport within a binder-free multilayered film could be selectively tuned through the creation of a nanoporous network. The empty pores acted as reservoirs for liquid electrolytes capable of fast Li-ion conduction. Meanwhile, the highly cross-linked SPAN1 and CNT facilitated electrical conductivity and, to a lesser extent, Li-ion transport. Second, the multilayered cathodes of the present invention improved energy density of LSBs. The control of cathode structure ensured a homogeneously sulfur distribution in discrete layers, which provided huge reactive interfacial areas that allow convenient incorporation and manipulation of sulfur into the selected layers. While the multilayers-electrolyte interfaces can be tuned, enhancing electronic and ionic conduction across the interfaces and thus leading to a maximization efficiency of sulfur. Third, the multilayered cathodes of the present invention effectively block polysulfide anions while the active material's functions and properties remain unaltered and ionic/electronic transfer limitations were eliminated. The positive charges on SPANI interact with polysulfide anions and reduce their dissociation from the multilayered structure. The PSS polymers form dense protective films to trap polysulfides. On the other hand, the SPANI and functionalized CNTs incorporated within the multilayered structure serve as chemical reaction sites for sulfur and intermediate polysulfides to ensure a more complete redox process. The structure allows for reversible in situ deposition of intermediate polysulfide species during discharge and their corresponding transformation during charge within the homogeneous functional group matrices, which further attract polysulfide anions from "leaking" of the multilayered cathodes. Fourth, the multilayered cathodes of the present invention enhanced stability of LSBs. The porous structure yields the mechanical properties, which could accommodate the volume change and the corresponding strains accumulated in the cathodes. In addition, the SPANI showed great electrochemical performances that stabilized the multilayered cathode.

EXAMPLES

Example 1

Preparation of Multilayered Sulfur Composite Cathodes

First, SPANI (sulfur polyaniline) was treated with NH2OH solution at 70° C. for 2 h, and S-CNT (sulfur-carbon nanotube) was mixed with poly(styrenesulfonate) (PSS, molecular weight (MW)~70,000, Sigma-Aldrich) solution for 2 h (hours). These treated powders were then sonicated for 6 h in deionized water separately to form uniform dispersions. The pH values of both solutions were adjusted to 3.5 and the solutions were sonicated for 3 h before LbL assembly. The purpose of introducing polystyrene sulfonate (PSS) here was to facilitate the growth of the multilayer films via electrostatic interactions between S-CNT and SPANI. Details of LbL assembly of electrodes are well known by those persons skilled in the art.

Assembled multilayered cathodes of this invention were dried in air and then treated at 90° C. (Centigrade) in a vacuum oven for 5 h to be prepared for cell assembling.

Surface Morphology

Figure 3:
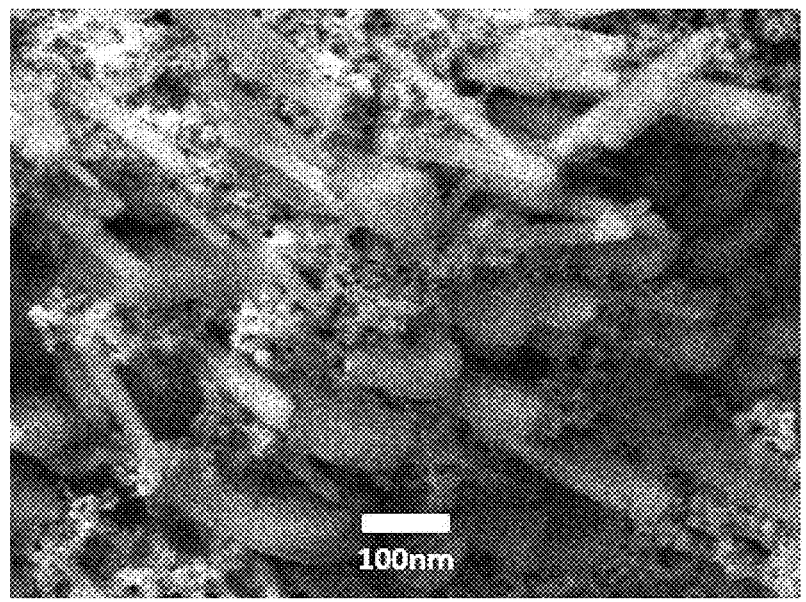
FIG. 3 shows scanning electron microscope (SEM) images for carbon-fiber anodes.
Figure 3:
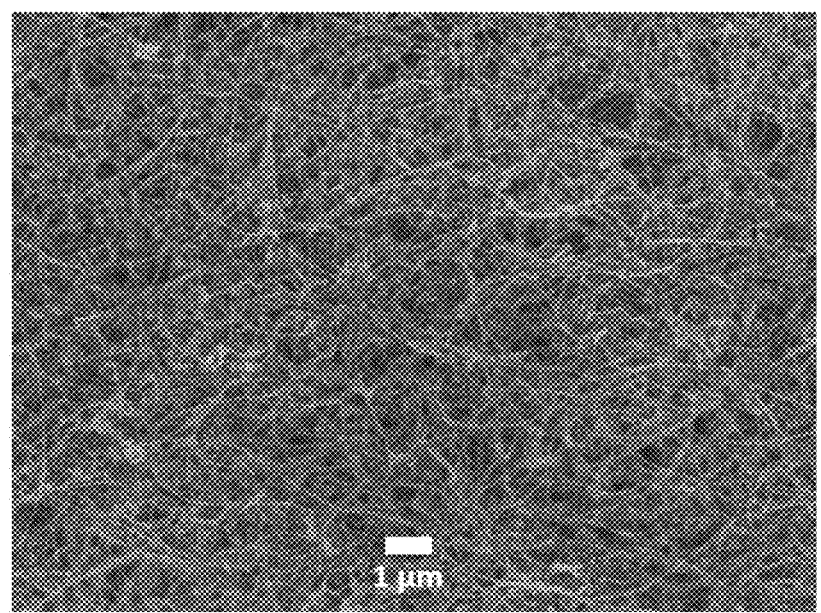

FIG. 3 shows scanning electron microscope (SEM) images of the multilayered sulfur composite cathode of this invention. The cross-section SEM showed that S-CNT/PSS and SPANI were well distributed throughout the multilayered film (FIG. 3a), and the outermost surface was covered with SPANI (FIG. 3b). In addition, the cathode has a smooth fibrous morphology and a 3D interconnected network with a porous structure (FIG. 3b). Such porous structure allows high electrode material loading with better electrode-current collector adhesion.

Cycle Performance

For the charge-discharge analysis, two-electrode coin cells (2032) with Li foil as counter electrode were assembled in an argon-filled glove box (Labstar). The electrolyte consisted of 1.0 M LiTFSI and 0.15 M $AgNO_3$ that dissolved in dioxolane (DOL) and dimethyl ether (DME) (1:1, v/v), and a micro-porous separator (Celgard) was used between the multilayered cathode and Li foil. Then the assembled cells were discharged and charged at three current densities of 550, 1300, and 1950 $mAg^{-1}$ between 1 and 3 V (vs. Li/Li+) using an Arbin battery test station (BT2000).

Figure 4:
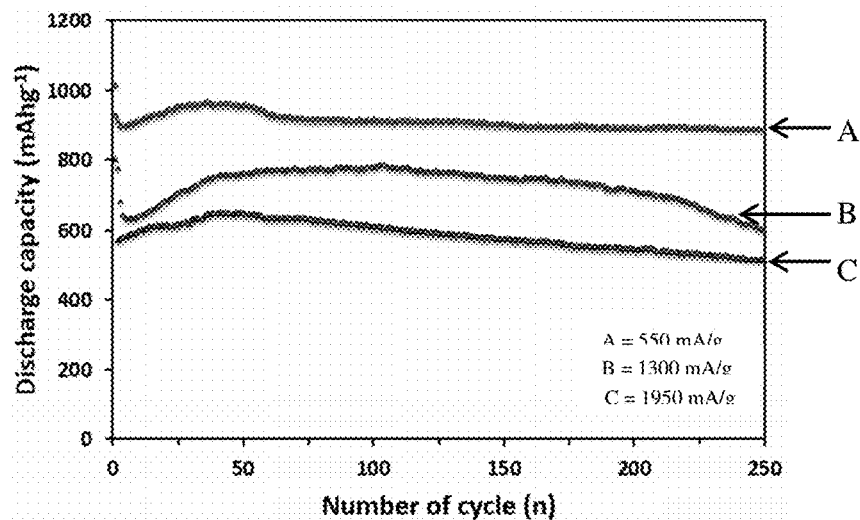
FIGS. 4a-b show cyclic properties of the multilayered cathodes of this invention.
FIGS. 4c-d show voltage profiles of the Li/S cells of this invention.
Figure 4:
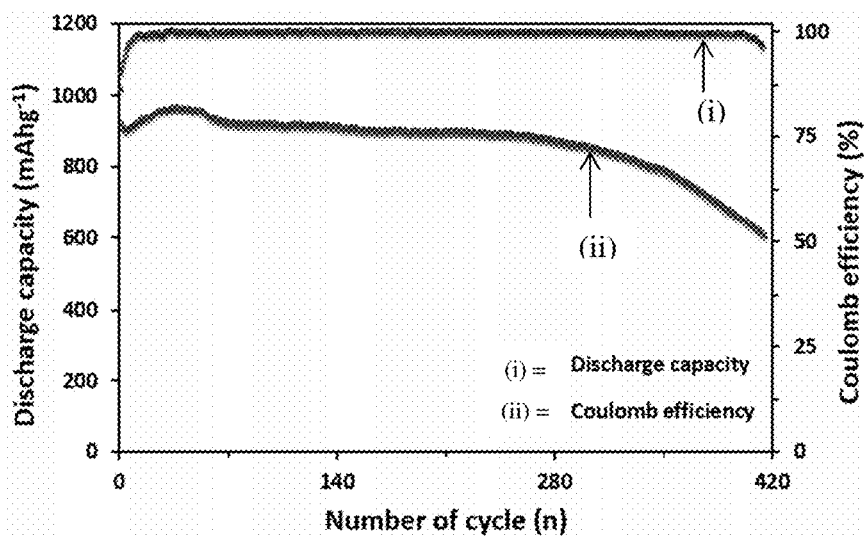
Figure 4:
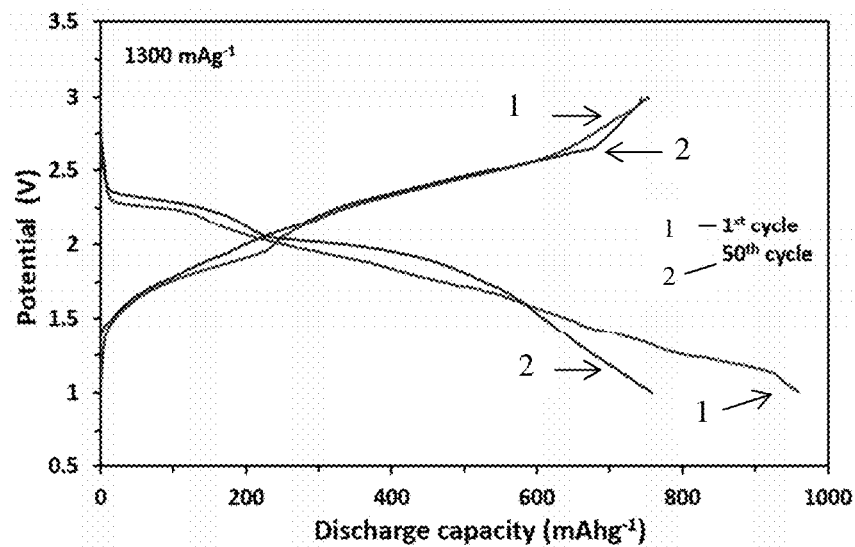
Figure 4:
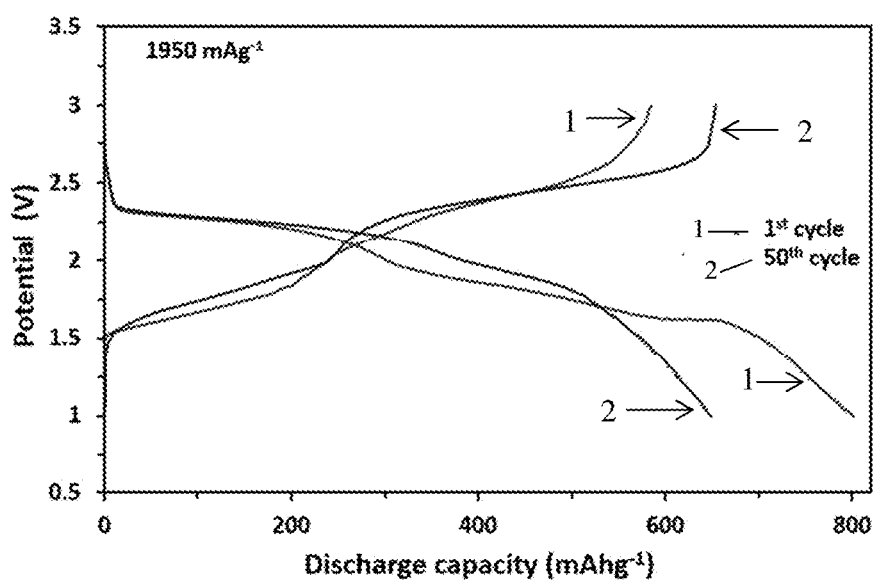

FIG. 4 shows the charge-discharge profiles of the multilayered cathodes including cycling performance, discharge capacity, coulombic efficiency and voltage information. The multilayered sulfur cathodes retained reversible gravimetric capacities of 920, 780, and 600 $mAhg^{-1}$ at a current density of 550, 1300, and 1950 $mAg^{-1}$, respectively (FIG. 4a). The capacities were calculated based on the whole materials' weight on cathodes. The multilayered cathodes exhibited high reversible capacities and long cyclic lifetimes. For instance, at the current of 550 $mAg^{-1}$, the multilayered cathodes had a high reversible capacity of 920 $mAhg^{-1}$ and a high retention capacity of 605 $mAhg^{-1}$ was still obtained even after 420 cycles (FIG. 4b). In addition, the multilayered cathodes had a high coulomb efficiency of about 100%. The voltage profiles of discharge/charge cycles of multilayered cathodes showed typical characteristics of combination of SPAM and S-CNT (FIGS. 4c and 4d).

Example 2

Lithium-Sulfur (Li—S) batteries suffer from major problems including low active material utilization, poor cycling performance, and low efficiency, mainly due to the high solubility of intermediate polysulfides and their side-reactions with electrolyte solvents and the Li-anode. Here, we report the development of advanced, multilayered, sulfur electrodes comprising alternately arranged, negatively charged S-carbon nanotube layers and positively charged S-polyaniline layers that effectively immobilize polysulfides in the multilayered cathodes preventing polysulfide migration onto the Li-anode. The use of a layer-by-layer self-assembly technique leads to a 3-D porous cathode via electrostatic attraction, and enables the fabrication of remarkably improved Li—S cells with a reversible capacity of 1100, 900, and 700 $mAhg^{-1}$ at 0.3, 0.6, and 1 C current, respectively, while also delivering an average Coulombic efficiency of 97.5% and providing a lifetime in excess of 600 cycles. The results provide important progress towards the understanding of the role of multilayered cathodes with positive charges toward the realization of high efficiency and long cycle performance for Li—S batteries.

Sulfur's high theoretical capacity of 1672 $mAhg^{-1}$, a tenfold greater capacity versus today's lithium ion batteries, make lithium-sulfur batteries an attractive candidate for meeting increasing demand for higher energy density, lower cost, and environmentally friendly energy storage devices. However, Li—S chemistry is inherently challenging.[1, 2] The formation of soluble, long-chain polysulfides ($Li_2S_n$, n≥4) during discharge/charge cycling common to most present-day Li—S battery designs leads to the irreversible loss of active materials from the cathode into the electrolyte and onto the Li-anode. The reduced polysulfides at the anode causes a continuous evolution of porous Li metal structure, and thus leads to unstable solid-state electrolyte interface layers, damaging long-term cell performance and presenting safety issues. Meanwhile, changes in the cathode morphology resulting from the 80 percent change in material volume during discharge/charge cycling induces strain inside the cathode, leading to low efficiency and fast capacity decay of cycling. Further, the detachment of $Li_xS$ from the carbon surface during cycling because of the high volume change of sulfur results in low sulfur utilization and severe capacity degradation. The chemistry results in uncontrollable deposition of lithium sulfide species on both the cathode and anode surfaces, significantly inhibiting further lithiation, leading to low sulfur utilization.[3-7]

To address these problems, various sulfur-carbon/polymer composites have been used to trap soluble polysulfides and provide fast kinetic reactions.[8-13] Other approaches focus on Li anode[14, 15] and electrolyte designs[16], aiming to prevent the undesirable interactions between polysulfides and the highly reductive Li-anode. However, these improvements have their own limitations. For example, the detachment of highly polar polysulfides from non-polar carbon conductive agents during discharge/charge and their subsequent dissolution into the electrolyte is believed to be an important factor in capacity degradation.[9-10, 17-18] These approaches require the significant use of binders, conductive agents, and modifying precursors in the cathode and thus neutralize the advantages of Li—S batteries.

Figure 5:
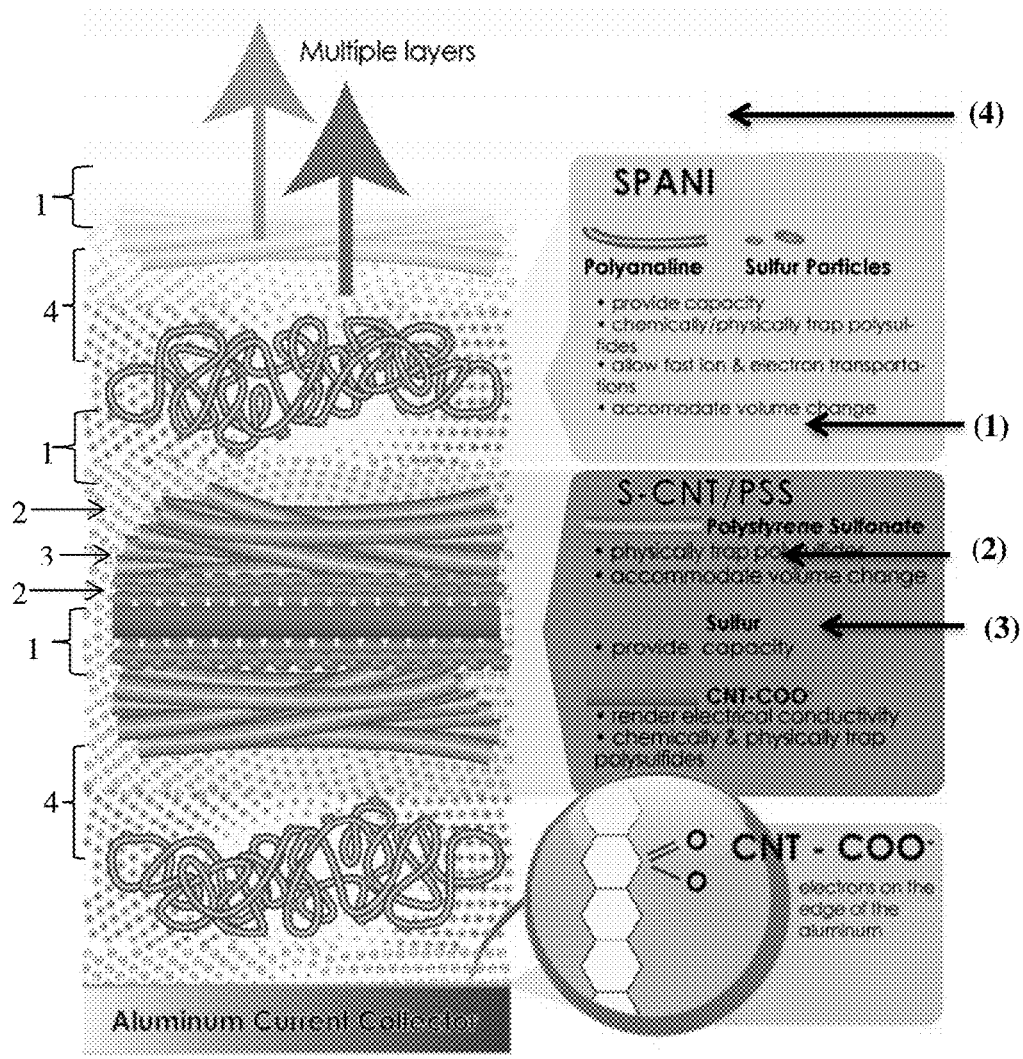
FIGS. 5a and 5b show another embodiment of the multilayered cathode of this invention.
Figure 5:
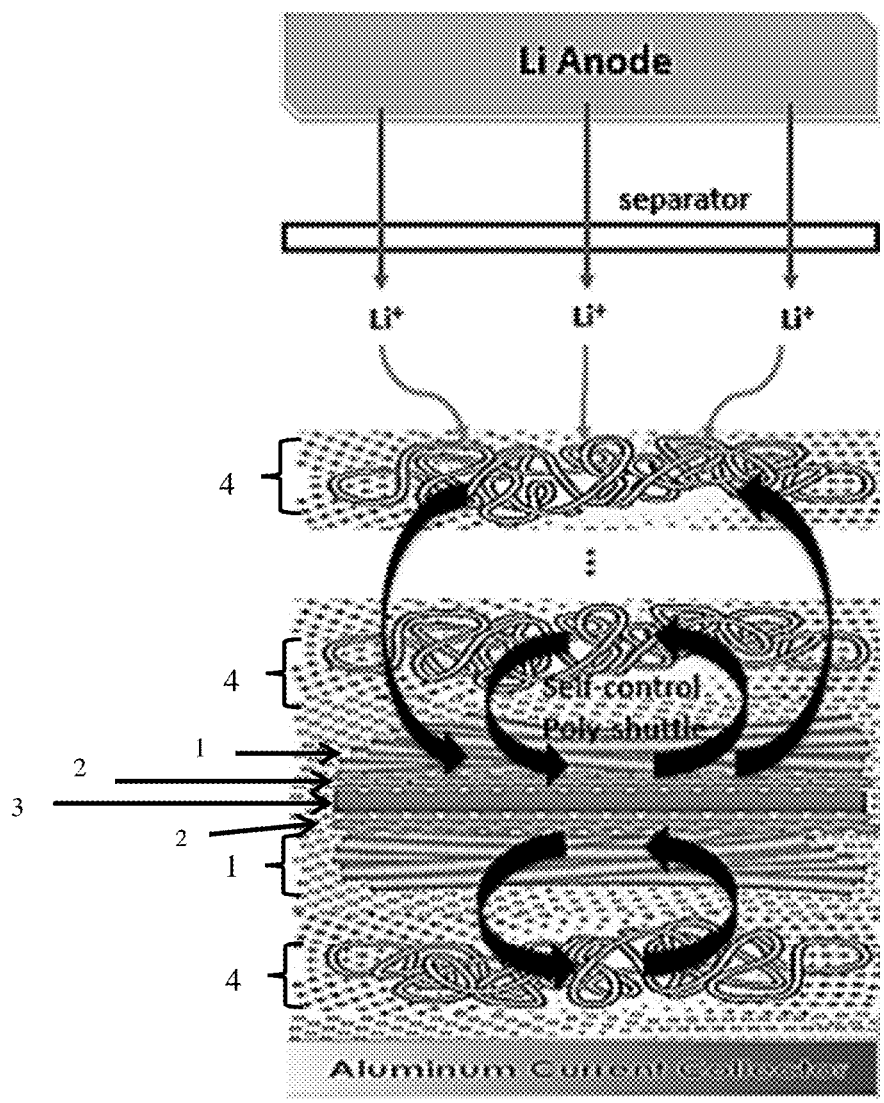

In this invention, we provide a process of making a multilayered sulfur composite cathode. Preferably, this process employs the layer-by-layer (LbL)-process[19] fabrication of efficient, multilayered sulfur cathodes to address the challenges of Li—S batteries. The multilayered cathodes were fabricated on aluminum current collectors by alternate adsorption of negatively charged S-carbon nanotubes polystyrene sulfonate (S-CNT-$PSS^-$) and positively charged S-polyaniline (SPANI)-$NH^+$ as shown in FIG. 1a. Polyaniline (PANI) was deposited as the outermost layer to prevent direct contact between sulfur and the electrolyte. Both CNT and PANI are attractive choices as sulfur carriers because of their high electronic and ionic conductivities, strong affinity, and high loading of sulfur and polysulfides.[20-27] Interconnected layers of S-CNT and SPANI with their multiple pores served as high efficiency binders, conductive agents, and 3-D mechanical scaffolds for the efficient use of sulfur. S-CNT layers sandwiched between two positively charged SPANI layers favored the immobilization and attachment of polysulfide anions within the highly conductive structures by providing strong interactions. The sandwich-like porous structures acted as self-control poly-shuttle frameworks by forming physical and chemical C—S bond barriers that retarded polysulfide migration from the cathode toward the Li-anode as shown in FIG. 5b. These advanced multilayered cathodes contained 67.5 wt. % of sulfur, enabling very high and stable reversible specific capacities of 1100, 900, and 700 $mAhg^{-1}$ at a current density of 0.3, 0.6, and 1 C, respectively, and provided a discharge/charge lifetime in excess of 600 cycles with an average Coulombic efficiency of 97.5%.

FIG. 5a shows a schematic diagram of multilayered cathode fabricated by the LbL-process and functions of each component. FIG. 5b shows a schematic diagram of the self-control poly-shuttle process in the multilayered cathode.

Results

Characterizations of the Multilayered Cathodes and Related Materials

Figure 10:
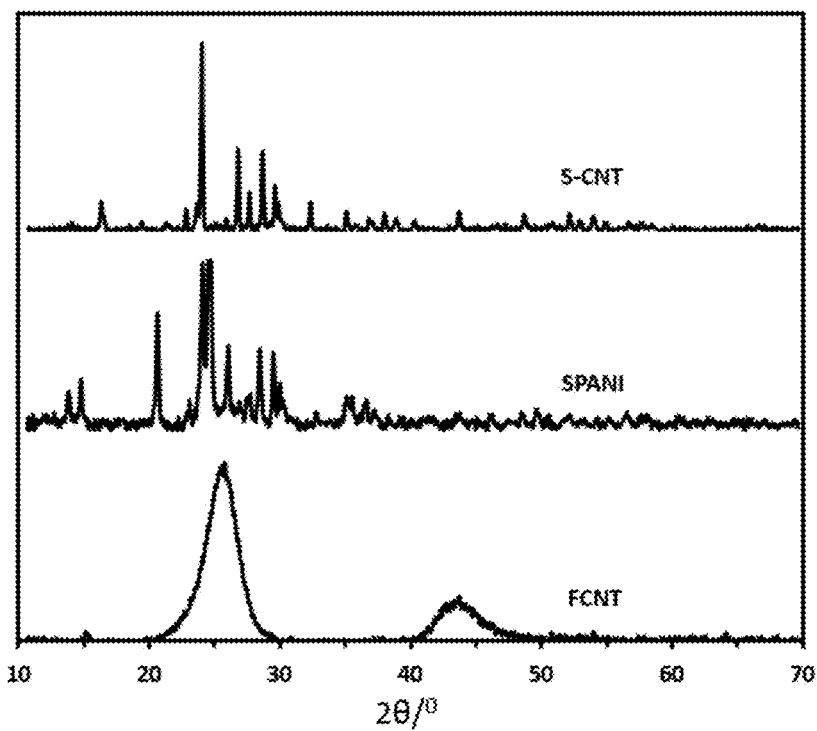
FIGS. 10a-c show analysis and spectra, respectively, of the materials of the multilayered cathodes of this invention.
Figure 10:
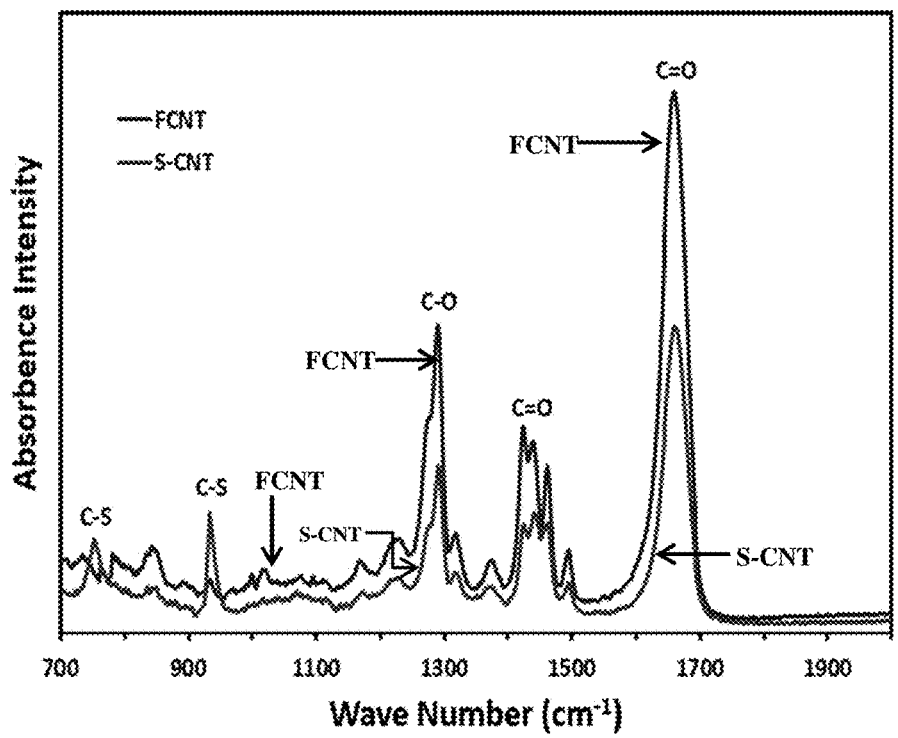
Figure 10:
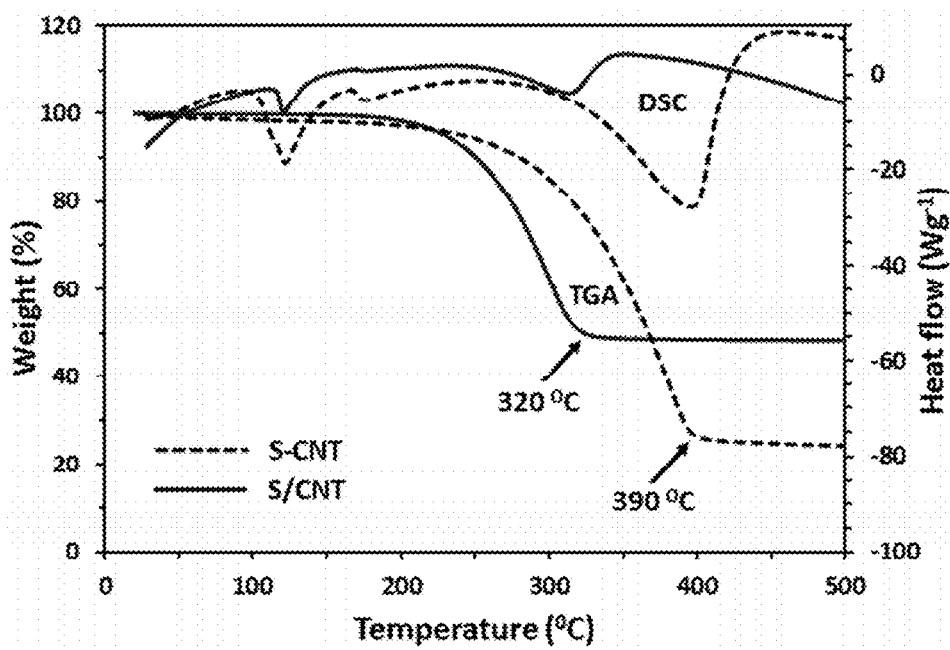
Figure 11:
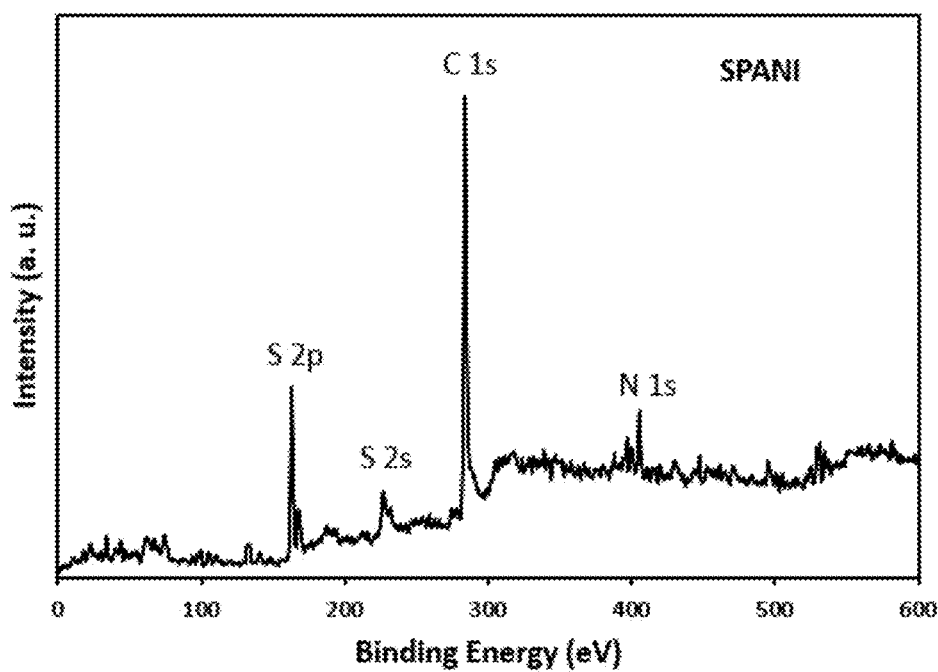
FIGS. 11a-c show analysis and spectra, respectively, of the materials of the multilayered cathodes of this invention.
Figure 11:
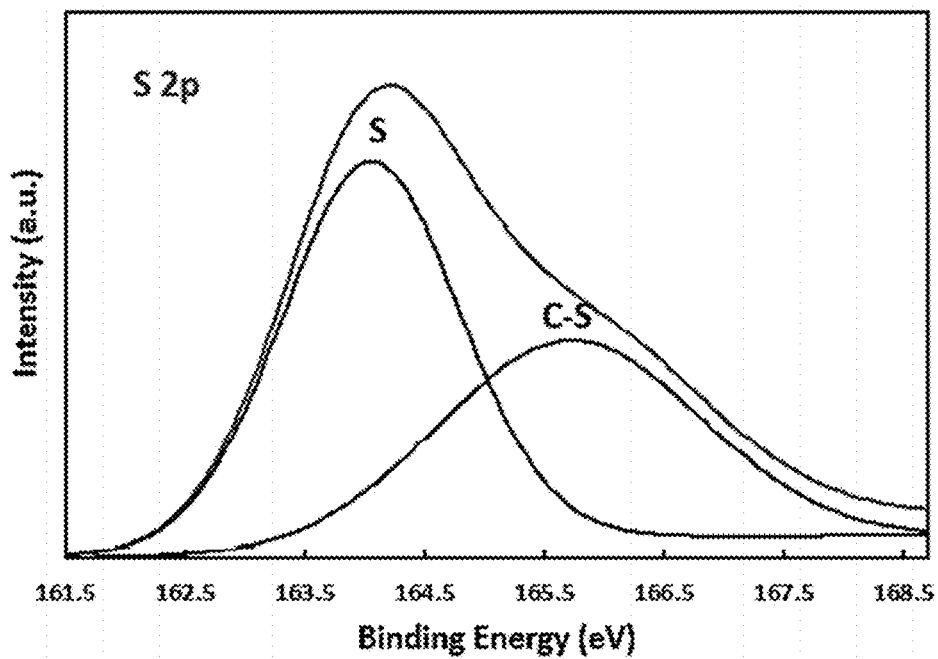
Figure 11C:
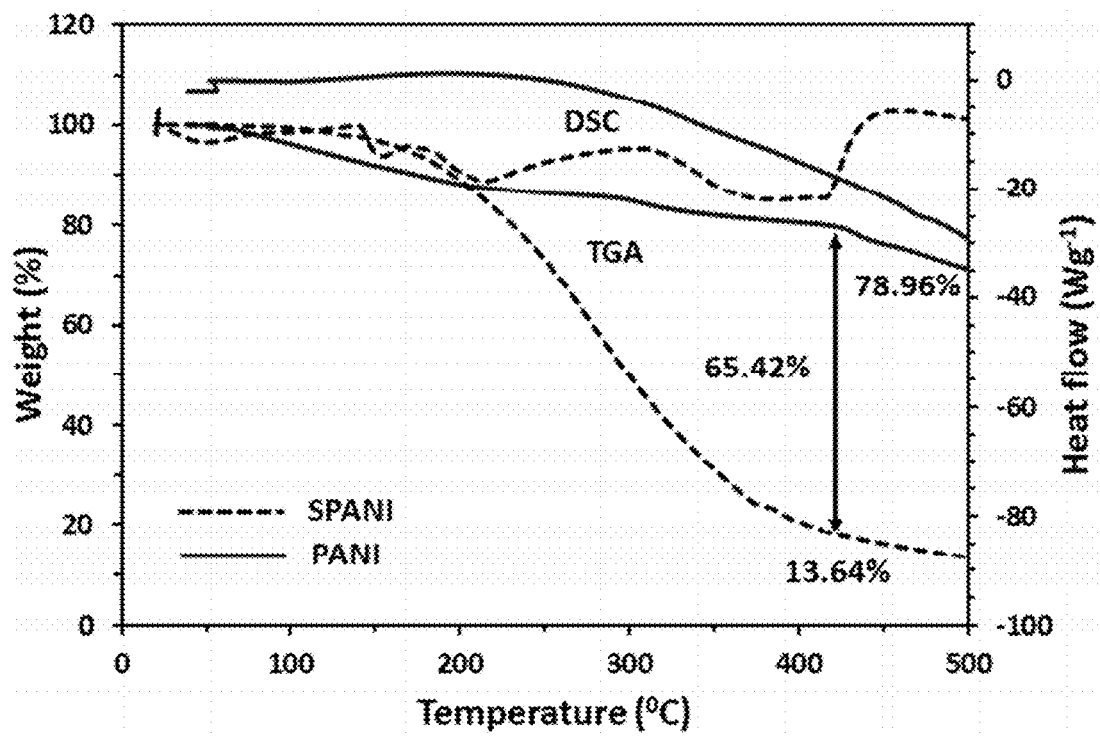

Materials. The S-CNT and SPANI were synthesized using functionalized CNT (FCNT) and PANI. The pristine FCNT tended to agglomerate due to strong van der Waals interactions) (FIG. 6a). However, these interactions appeared to weaken after a thin layer of sulfur (~20 nm thick) was uniformly coated on the surface of the FCNT (FIG. 6b). The deposition of sulfur onto the FCNT was evaluated by X-ray diffraction (XRD). No obvious characteristic peaks of FCNT were observed for S-CNT (FIG. 10a). A monoclinic sulfur phase was detected by XRD in S-CNT after heating at 159° C. (Centigrade) for 8 h (hour) then 300° C. for 1.5 h. At 300° C., $S_8$ rings may break down into much more active, smaller sulfur allotropes ($S_6$ and $S_2$) which readily dehydrogenate and react with carbon or substitute for oxygen atoms to form covalently bonded sulfur.[23, 28] The C—S bonds were verified by the two additional peaks at 740 cm$^{-1}$ and 933 cm$^{-1}$ in the Fourier transform infrared spectroscopy (FTIR) analysis (FIG. 10b), since it is known that $S_8$ shows no vibrational activity in the 900 to 2000 cm$^{-1}$ range. The sulfur content in the S-CNT was found to be 76.9 wt. % by thermo gravimetric analysis (TGA) (FIG. 10c). TGA results indicated that the weight-loss and weight-loss temperature of S-CNT was higher than those of S/CNT composites, suggesting a promoted affinity and interaction between sulfur and FCNT. The typical morphology of the SPANI was shown in FIG. 6c where bulk sulfur particles were also found on SPANI surfaces attributed to strong capillary force during the post-heat treatment. X-ray photoelectron spectroscopy (XPS) was conducted on the SPANI polymer and the fitted curves indicated the back-chains of PANI were chemically modified and physically coated with sulfur (FIGS. 11a and 11b). TGA results indicated the sulfur content in SPANI was 65.4% (FIG. 11c).

Figure 6:
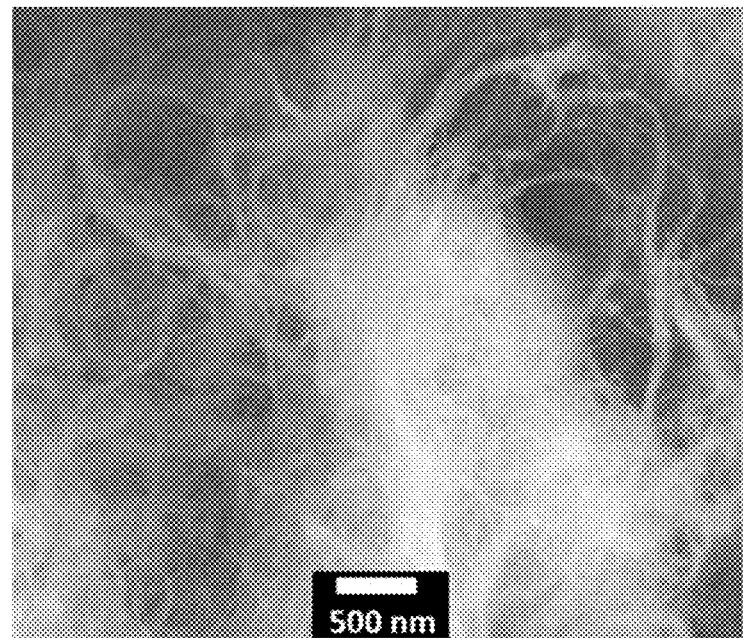
FIGS. 6a-i show characterizations of the multilayered cathodes of this invention.
Figure 6B:
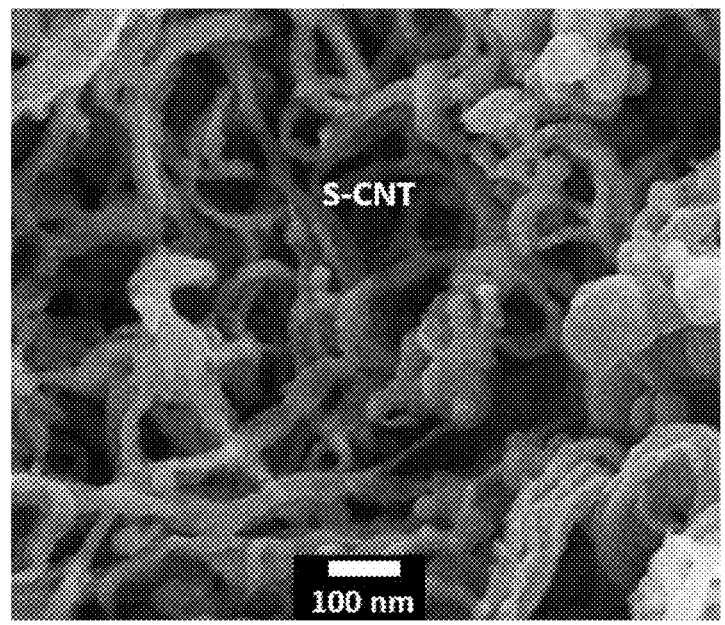
Figure 6:
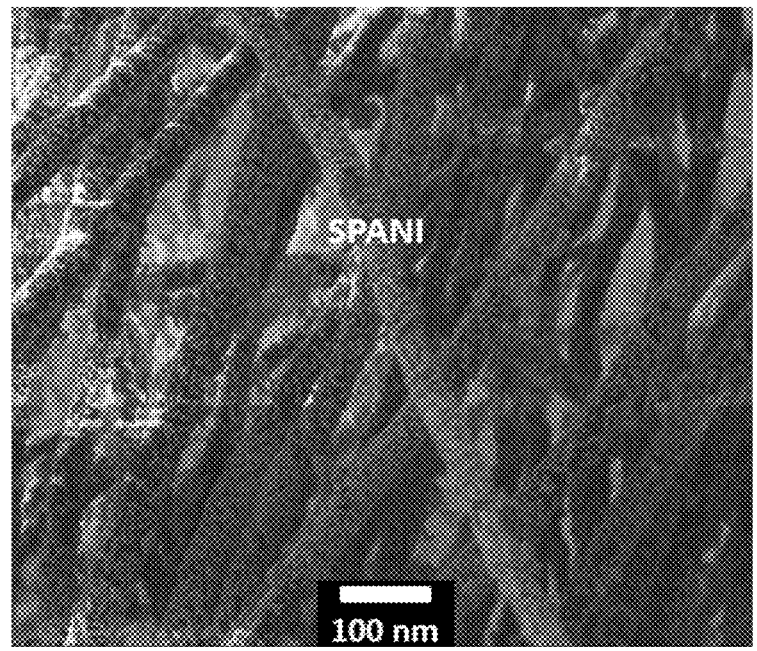
Figure 6:
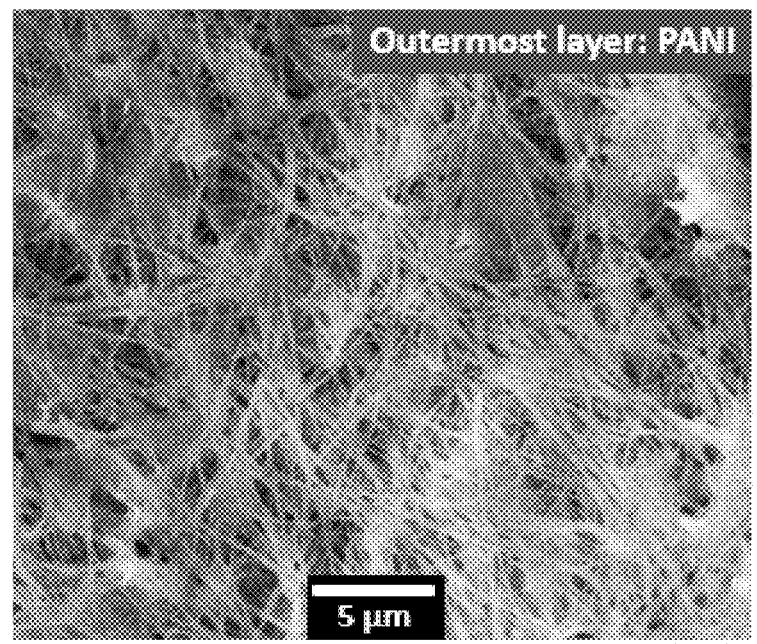
Figure 6:
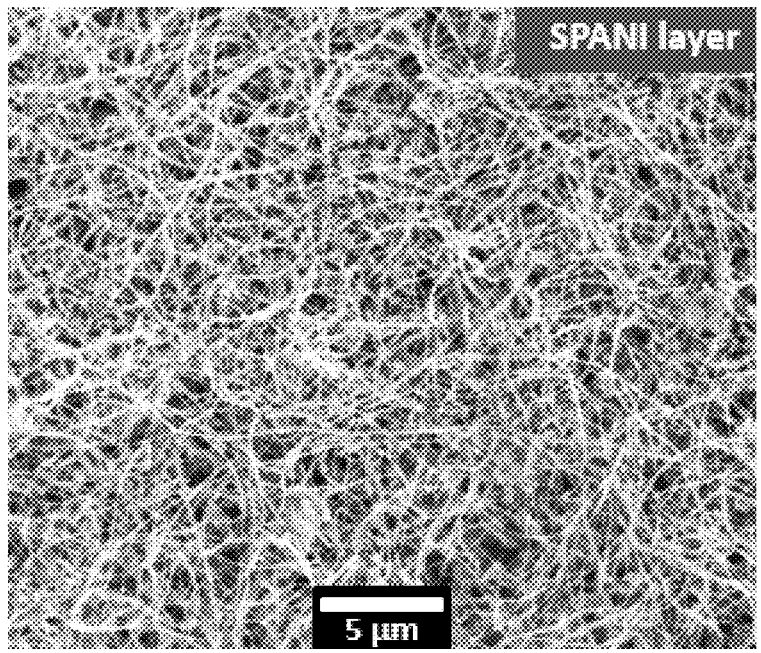
Figure 6:
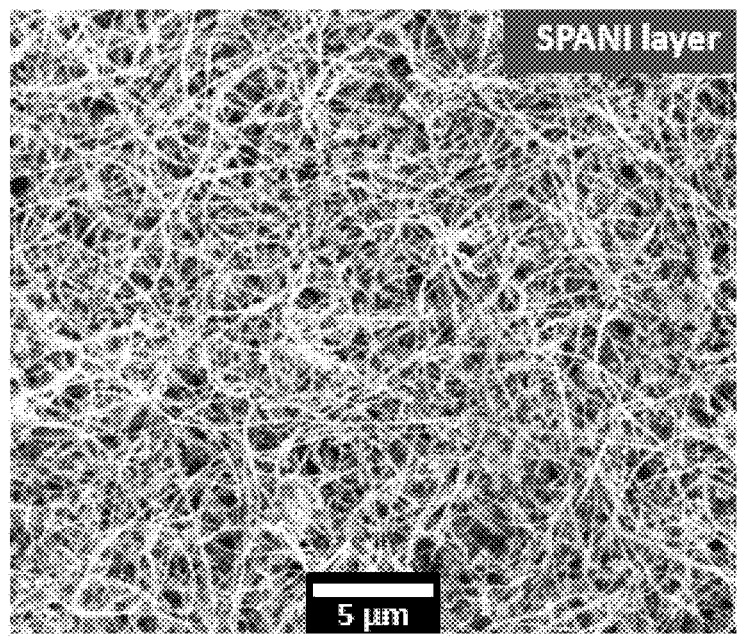
Figure 6:
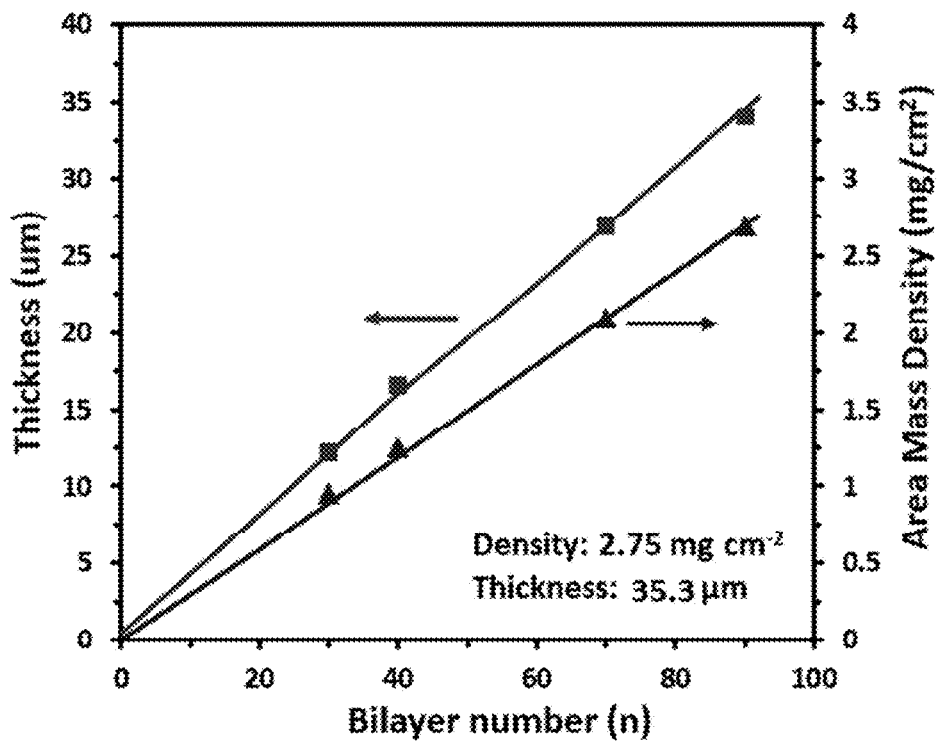
Figure 6:
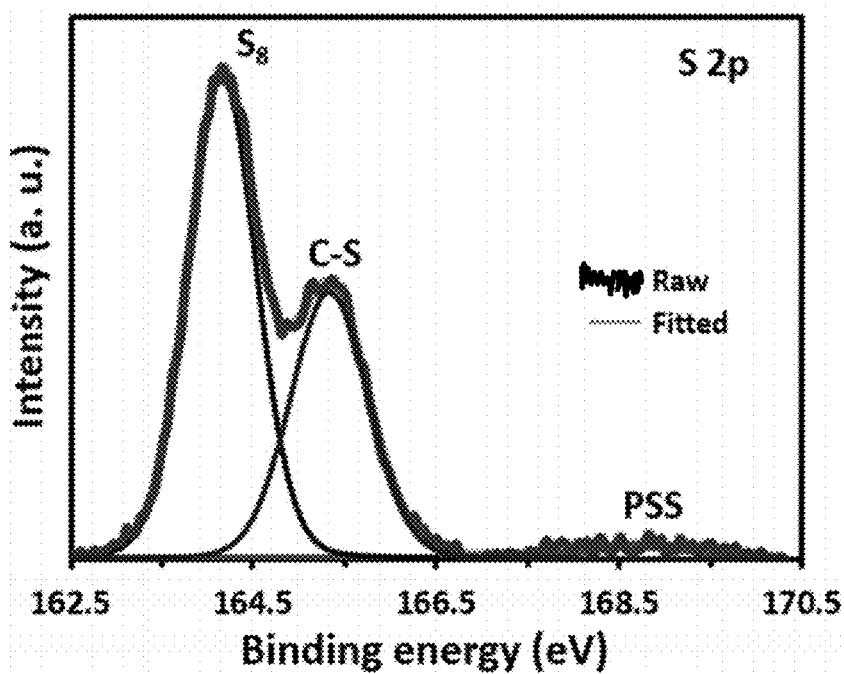
Figure 6:
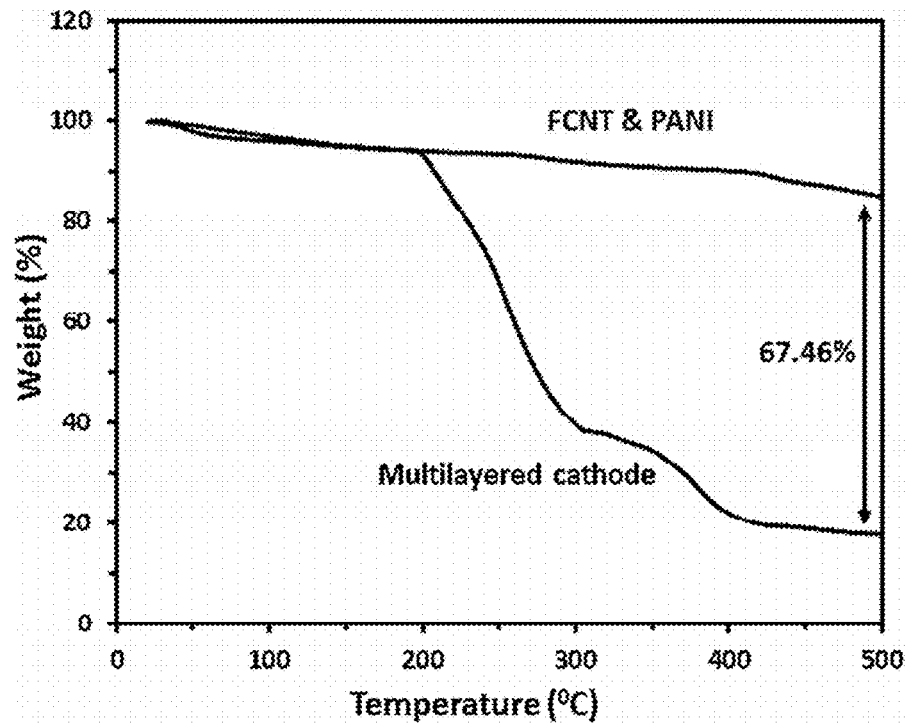

The ultrahigh aspect ratio and good mechanical strength of FCNTs and PANIs create a multilayered cathode of this invention having a robust structure that possesses abundant interconnected channels through which Li-ions may pass (FIGS. 6d-6f). These channels form 3-D porous frameworks that favor the penetration of electrolytes. Since sulfur is involved in multi-step reactions during discharge and charge, Li-ion and electron transport is an important factor. The empty pores in the multilayered cathode acted as reservoirs for liquid electrolytes capable of fast Li-ion conduction. Meanwhile, the highly intertwined PANIs and FCNTs facilitated electrical conductivity and, to a lesser extent, Li-ion transport. The multilayered structure forms a 3-D integrated skeleton and the discrete layers ensure a homogeneous sulfur distribution. The skeleton provides huge reactive interfacial areas that allow convenient incorporation and manipulation of sulfur. The structure facilitates electronic and ionic conduction across the multilayered interfaces between the discrete layers and the electrolyte, maximizing the efficiency of the sulfur in combining with lithium. The thickness of the multilayered cathode increased approximately linearly with the increasing number of bilayers; the cathode with 90 bilayers had a thickness of 35.3 µm with a material density of 2.75 mg·cm$^{-2}$ after heat treatment (FIG. 6g). XPS analysis of the multilayered cathodes after heat treatment revealed significant amounts of $S_8$ and C—S bonds within the cathodes (FIG. 6h). The peak at 164.4 eV in the S 2p3/2 spectrum indicates elemental sulfur, while the peak at 165.4 eV in the S 2p1/2 spectrum suggests that S atoms were linked to a benzenoid ring (SPANI) and a quinoid ring (sulfurized CNT). The small peak at 168.5 corresponds to PSS. The atomic composition of the multilayered cathode was found to be 29.2 wt. % carbon, 64.1 wt. % sulfur, 4.6 wt. % oxygen and 2.1 wt. % nitrogen. TGA results indicated the sulfur content in the whole cathode was 67.5% (FIG. 6i). FIG. 6 shows the characterizations of multilayered cathodes and related materials. (6a-f) are scanning electron microscopy (SEM) images of (6a) FCNT, (6b) S-CNT, (6c) SPANI, (6d) the outermost layer, PANI, (6e) SPANI layer, and (6f) S-CNT layer. FIG. 6 (g) shows the area mass density (mg cm$^{-2}$) and thickness (µm) vs. bilayers of multilayered cathodes on aluminum current collectors. FIGS. 6(h) and 6(i) show XPS and TGA analysis for the multilayered cathodes. In FIG. 6(i), the sample of FCNT & PANI was used as a background comparison for the calculation of sulfur content in the multilayered cathodes. The sample was prepared with the same method for fabricating the multilayered F-CNT-SPANI cathodes.

Electrochemical Performance of the Multilayered Cathodes of this Invention

Figure 7:
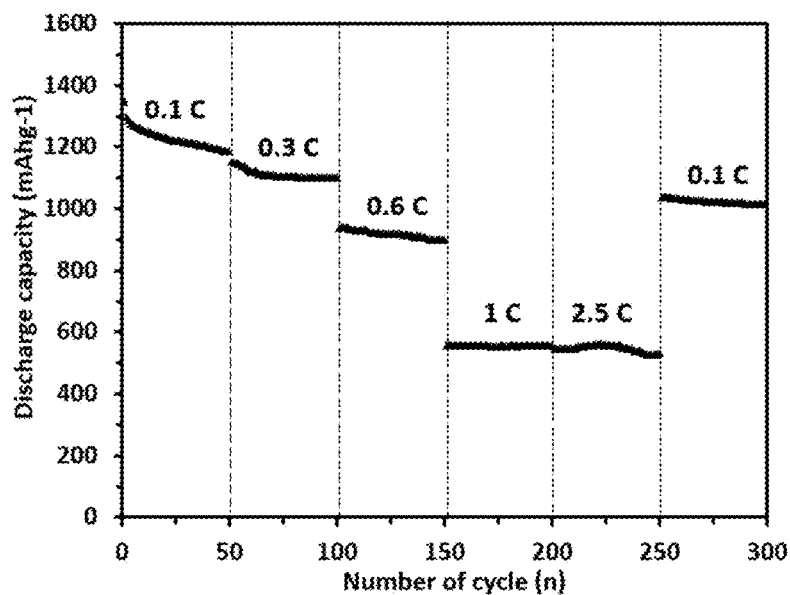
FIGS. 7a-c show rate performance of the multilayered cathodes of this invention.
FIGS. 7d-f show SEM images of the multilayered cathode structure.
Figure 7:
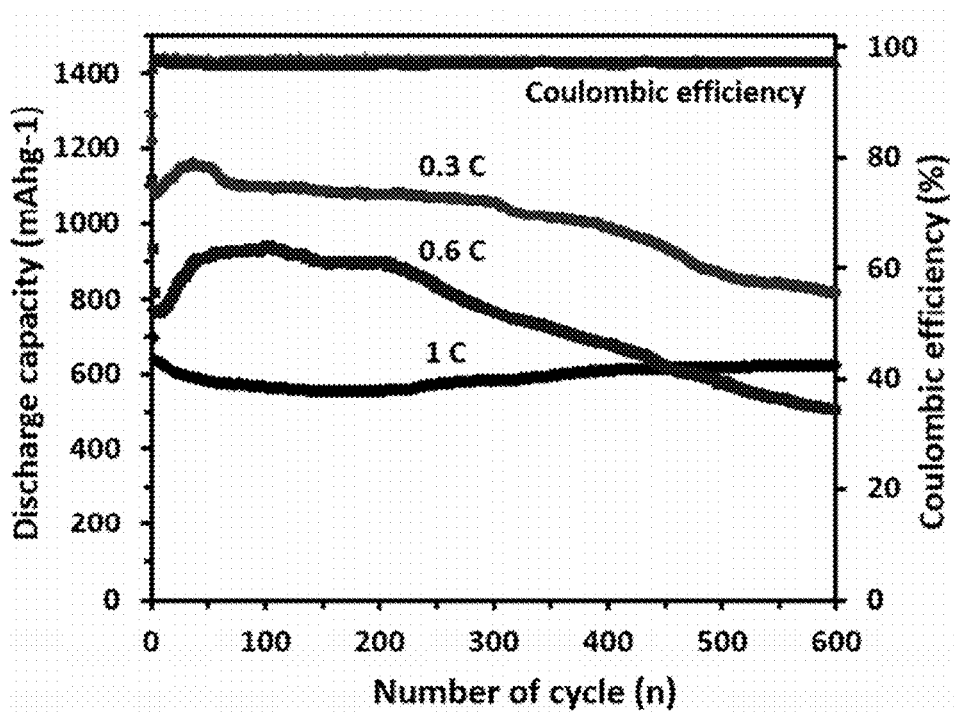
Figure 7:
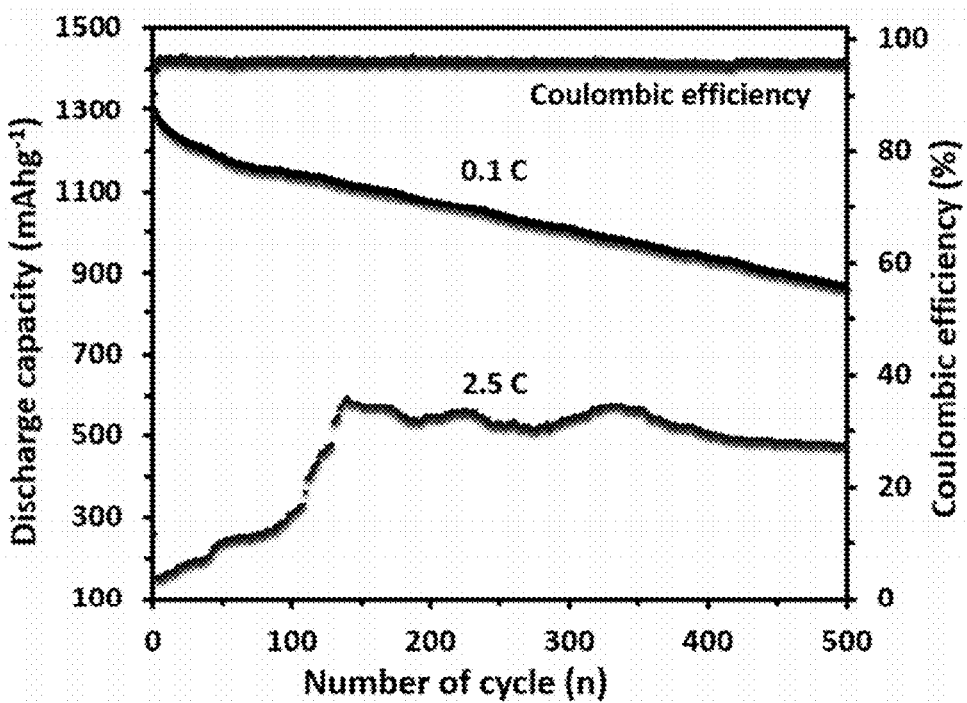
Figure 7:
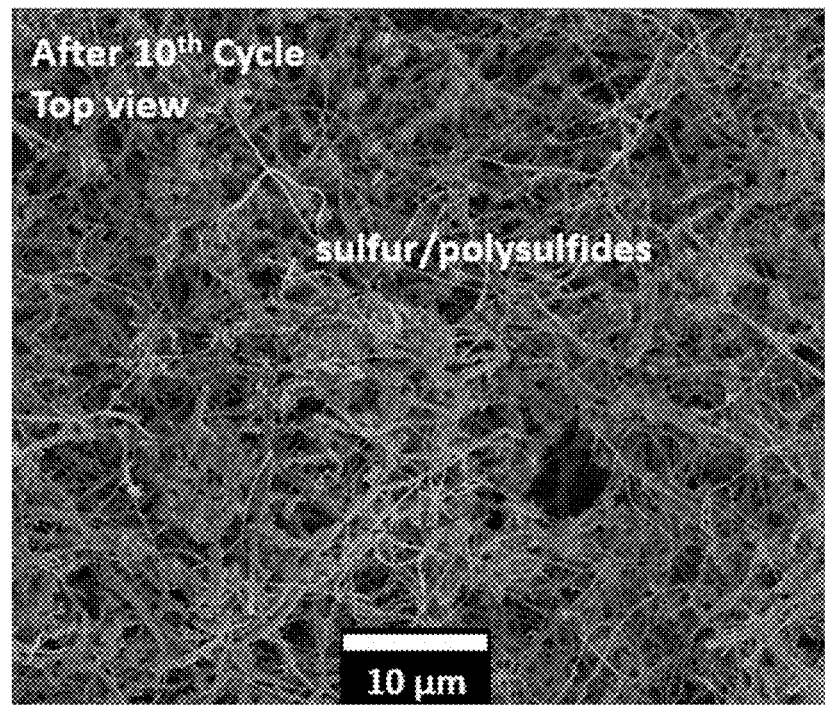
Figure 7:
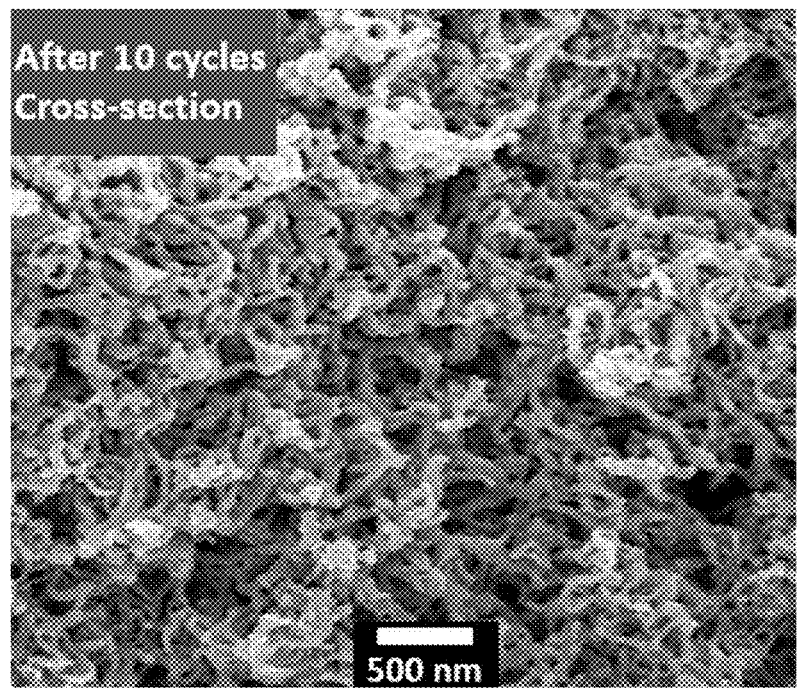
Figure 7:
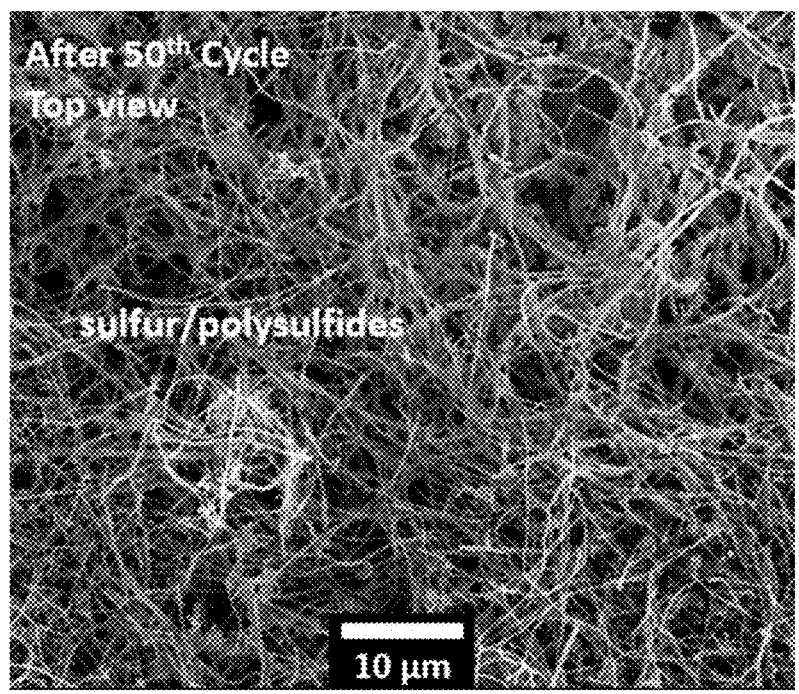

The rate capability of the multilayered cathodes is shown in FIG. 7a. The C rates specified in this study are based on the theoretical capacity of sulfur, with 1 C=1675 mAg$^{-1}$. The initial discharge capacity reaches 1346 mAhg$^{-1}$ at 0.1 C, which is 80.4% of the theoretical value for sulfur. A reversible capacity of 1014 mAhg$^{-1}$ was observed at the 300$^{th}$ cycle, corresponding to 75.3% capacity retention. The results demonstrated the superiority of the multilayered structure in enhancing the active material utilization. As current density varied from 0.1 to 2.5 C, the multilayered cathodes still displayed reasonable capacity although capacity decreased gradually due to polarization effect. Even at a rate of 2.5 C, the cell capacity exceeded 600 mAhg$^{-1}$, demonstrating exceptional rate performance and robustness of the structures. The long-term cycling behavior and Coulombic efficiency of Li—S cells containing multilayered cathodes at different current densities is shown in FIGS. 7b and 7c. Significantly improved cycling stability was observed at all rates studied. For instance, at 0.3 C, the multilayered cathodes had a high reversible capacity of 1100 mAhg$^{-1}$. A reversible capacity of 818 mAhg$^{-1}$ was obtained even after 600 cycles, corresponding to 74.4% of capacity retention with an average Coulombic efficiency of 97.5%.

At 0.3, 0.6, 1, and 2.5 C, the decrease in the first few cycles followed by an increase in discharge capacity were observed, indicating the multilayered cathodes required an activation step. The decrease was probably caused by the catalytic reduction of electrolyte solvents on the fresh surfaces of the multilayers, and the formation of solid electrolyte interface films on Li-anodes. The increase was related to the solubility of polysulfides. Initially, the cathodes contained bulk sulfur, which could not completely react at the end of discharge. After a few cycles, the electrolyte infiltrated into the internal layers and the bulk sulfur reacted and pulverized, leading to small sulfur particles. Subsequently, the cells reached steady state and showed stable cyclic properties. However, there was no activation process at 0.1 C, indicating a threshold current for the multilayered cathodes in the first a few cycles, below which most of sulfur is reacted and above which a significant amount of sulfur remains at the end of discharge.

The high capacity and excellent cycling stability of multilayered cathodes may be explained by their unique layered porous structures. Unlike sulfur cathodes fabricated by slurry-coating with their inferior efficiency and low capacities (FIG. 12) due to polysulfide shuttling and poor contact between sulfur and carbon during discharge/charge, the multilayered porous frameworks led to improved Li—S cell performance for three reasons: (i) the multilayered cathodes provided adequate high-efficient electron and Li-ion conduction channels formed by the abundance of 3-D pores (FIGS. 6c and 6d); (ii) the multilayered cathodes provided strong affinity of polysulfides and reduced their dissociation from the selected layers during cycling (FIGS. 7d and 7f). The intimate contact layers further attracted polysulfide anions and prevented the anions from "leaking" out of the multilayered structure (FIG. 7e); and (iii) The porous frameworks yielded mechanical properties that accommodated the volume change of the sulfur and the corresponding strains accumulated in the cathodes, thus leading to improved cycling stabilities.

FIG. 7a shows rate performance of multilayered cathodes, and long-term cycling performance of multilayered cathodes at (FIG. 7b) 0.3, 0.6 and 1 C, and (FIG. 7c) 0.1 and 2.5 C. SEM images reveal that the discharge products are kept on the cathode structure at $10^{th}$ cycle (FIG. 7d top view and (FIG. 7e cross-section) and (FIG. 7f) $50^{th}$ cycle.

Figure 8:
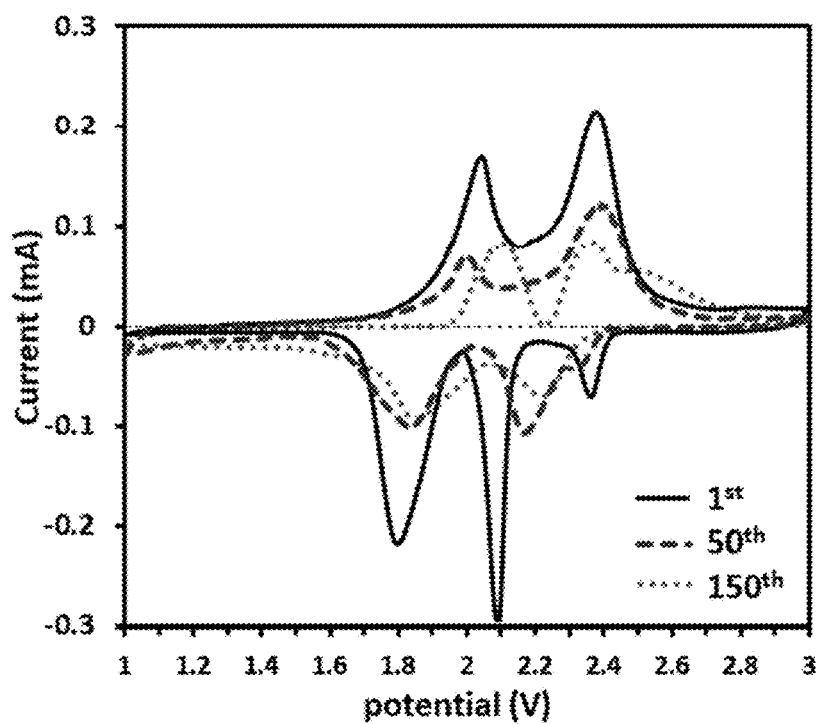
FIG. 8a shows a CV scan of the multilayered cathodes of this invention.
FIG. 8b shows a voltage profile of the multilayered cathodes of this invention.
FIGS. 8c-f show top surface characterization of the multilayered cathodes of this invention at various cycles.
Figure 8:
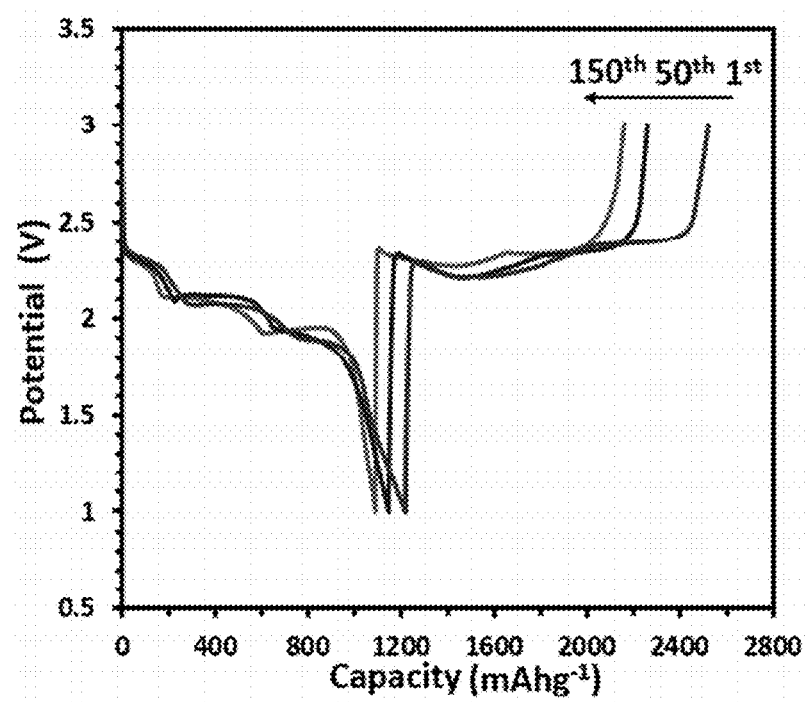
Figure 8:
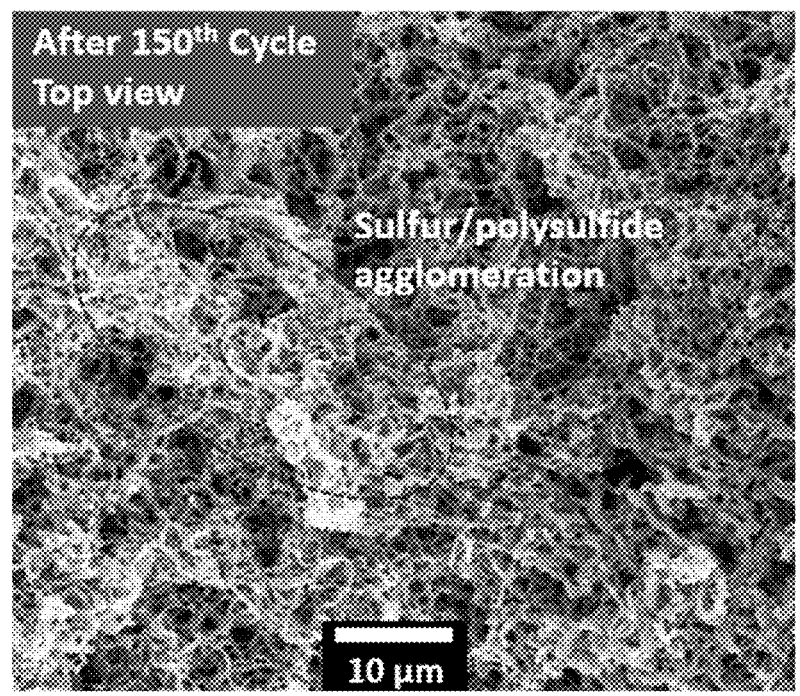
Figure 8:
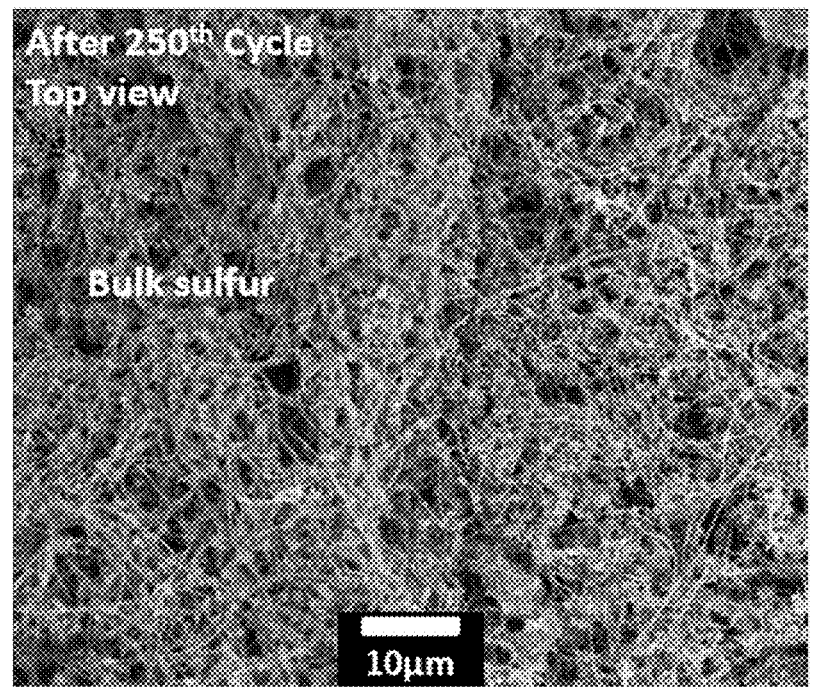
Figure 8:
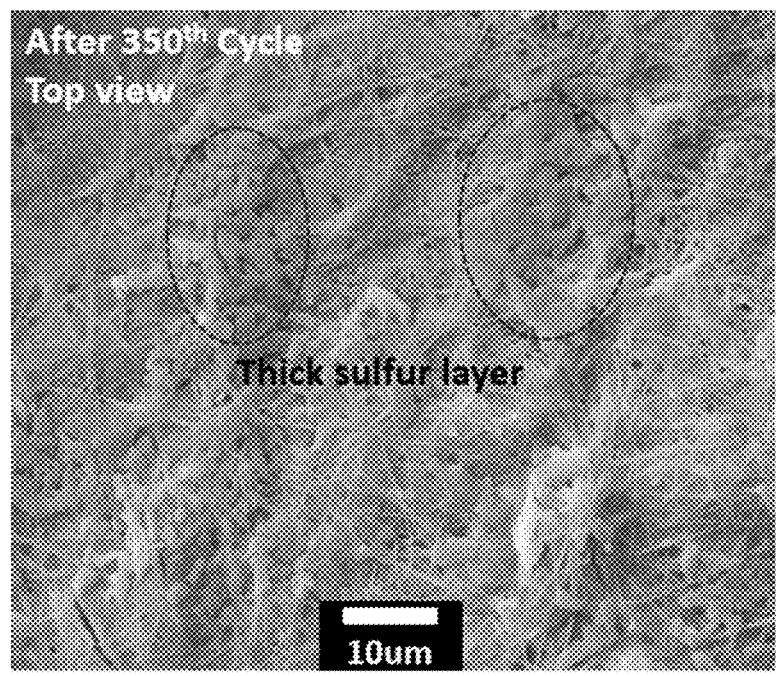
Figure 8:
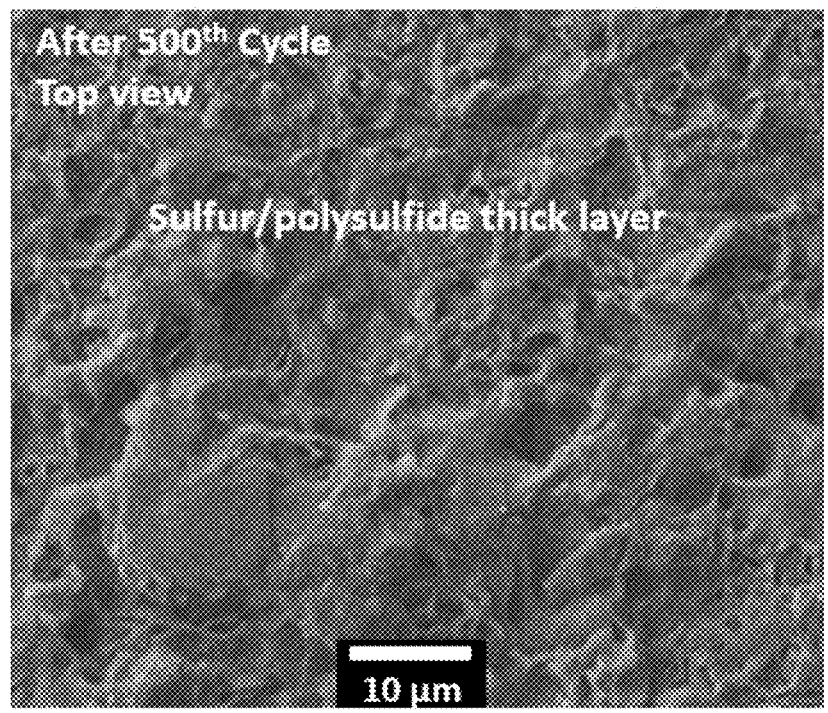
Figure 13:
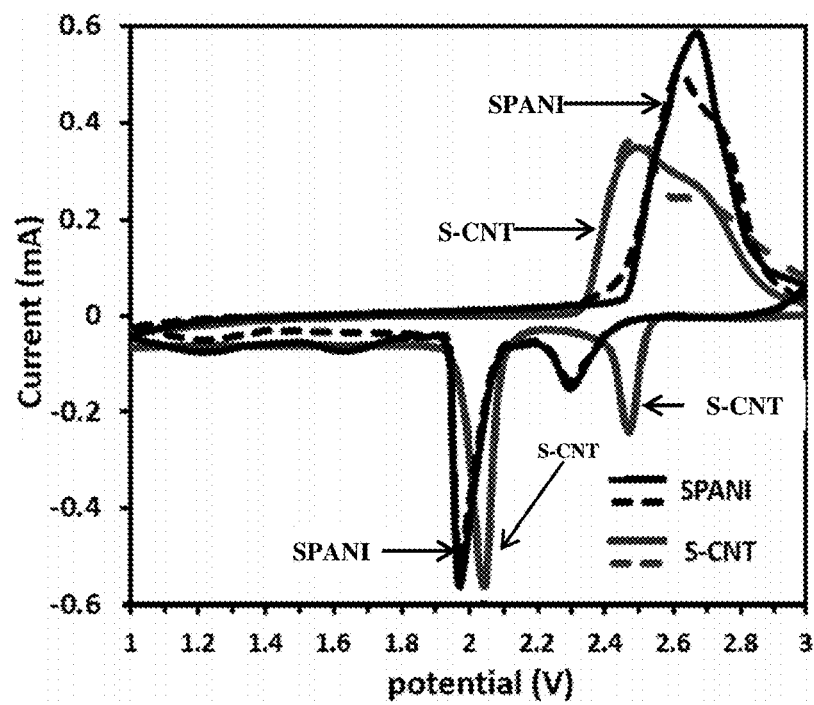
FIG. 13 shows CV data of S-CNT and APANI cathodes of this invention.
Figure 14:
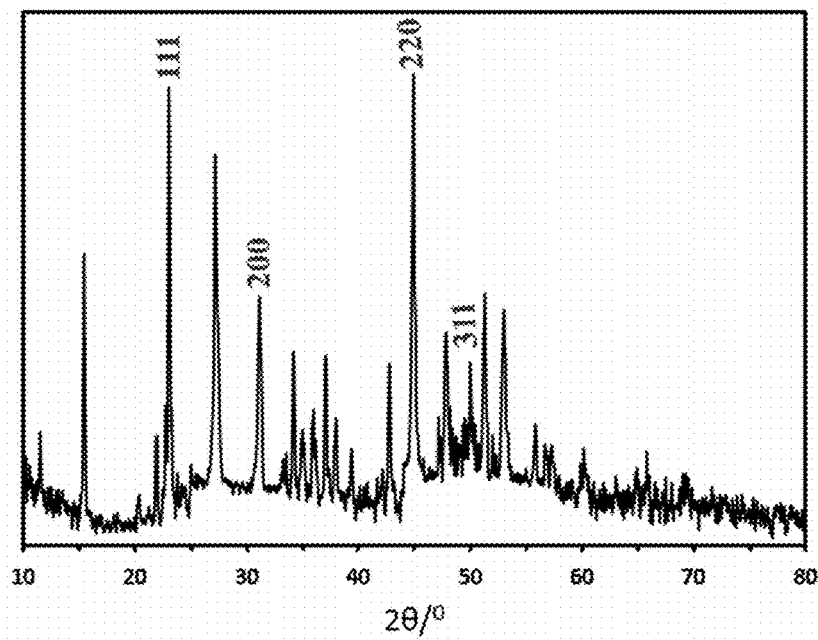
FIG. 14 shows XRD data of the multilayered cathode of this invention.

Electrochemical Reaction Processes in the Multilayered Cathodes of this Invention The electrochemical reaction mechanism of sulfur in multilayered cathodes was revealed using the cyclic voltammetry (CV) at a scan rate of 0.05 mVs$^{-1}$. As shown in FIG. 8a, the fresh multilayered cathode featured three reduction current peaks at around 2.35, 2.1, and 1.8 V. The first two narrow peaks showed typical characteristics of two-step reduction of sulfur from solid-liquid ($S_8$—$S_6^{2-}$) and liquid-solid ($S_6^{2-}$—$Li_2S_2$) phase transitions. The third broad reduction current peak at 1.8 V was lower than the potential of $S_4^{2-}$ to $Li_2S_2$ reaction at around 2.1 V. For comparison, we plotted the CV curves of SPANI and S-CNT-based cells (FIG. 13). Both S-CNT and SPANI showed typical sulfur characteristics with two reduction peaks at 2.44/2.04 and 2.3/1.97 V, respectively. These observations indicate that the multilayered cathodes experienced a new reaction represented by the reduction peak at 1.8 V, which is possibly attributed to the reaction from $Li_2S_2$ to $Li_2S$. As shown in FIG. 14, the four characteristic peaks at 23°, 31°, 45°, and 50° in the XRD pattern indicate the existence of $Li_2S$. However, the CV curves at the $50^{th}$ cycle showed significantly different behavior. The first two reduction peaks showed in the initial cycle were substituted by a new broad peak centered at 2.2 V in the $50^{th}$ cycle. Most likely the high potential polarization between soluble, high-order polysulfides (HPS, i.e. $Li_2S_n$, n≥3) and insoluble, low-order polysulfides ($Li_2S_n$, n≤2) caused an overlap of the two possible reduction peaks. The continuous CV scan of the multilayered cathodes shown in FIG. 15 demonstrates the gradual changes during the electrochemical reaction processes.

The discharge/charge profiles in FIG. 8b exhibit three discharge plateaus at 2.3, 2.1, and 1.9 V and two discrete charge plateaus at 2.3 and 2.4 V, which were consistent with the CV analysis. The upper discharge plateau at 2.3 V corresponded to the reduction of sulfur into soluble lithium polysulfides, indicating the effective utilization of sulfur. The capacities corresponding to this plateau at $1^{st}$, $50^{th}$, and $150^{th}$ cycles were identical, demonstrating the effectiveness of the multilayered cathode in trapping soluble polysulfides and enhancing the utilization of sulfur. The multilayered cathodes reduced sulfur to $Li_2S_2$ and $Li_2S$ before possible soluble polysulfides could diffuse out of the multilayered cathode into the liquid electrolytes. When sulfur in each layer is reduced upon full discharge, the strong affinity of polysulfides for the sandwich-like porous frameworks is vital for retaining the active mass and electrical contact of sulfur/polysulfides with the conductive framework. SEM images of the multilayered cathodes in the discharged state revealed that the discharge products, namely (name the discharge products here), were uniformly kept within the cathode structure to form thick layers instead of discrete particles, implying the strong interaction between polysulfides and the multilayered structure. As shown in FIGS. 8c-f, after the activation process, the initial bulk sulfur dissolved into small sulfur particles or formed thin sulfur layers distributed in the discrete layers (FIGS. 8c and 8d). The multilayered cathode had adequate pores to store sulfur and polysulfides (FIGS. 8e and 8f), and until the $500^{th}$ cycle, the porous framework was covered with thick sulfur/polysulfide layers. As previously discussed, the unique multilayered structure in the cathodes prevented the dissolution of polysulfides as follows: (i) the tightly intertwined surface groups not only fixed polysulfides and resulted in enhanced maintenance of the structural integrity of the cathode during cell operation, but also provided special reaction sites for sulfur (i.e. C—S bonds) to facilitate a more complete transformation from $S_8$ to $Li_2S_2$ and $Li_2S$; (ii) the electrostatic interaction between the alkylammonium cations and polysulfide anions efficiently entrapped polysulfides during the repeated cycles, leading to excellent cycling stability; and (iii) the highly porous 3-D framework achieved high utilization of sulfur and fast kinetics by providing highly efficient electron and ion pathways.

FIG. 8a shows CV scans of multilayered cathodes (scan rate was 0.05 mVs$^{-1}$); FIG. 8b shows voltage profiles of multilayered cathodes at $1^{st}$, $50^{th}$ and $150^{th}$ cycles; and top surface characterization of multilayered cathodes arte shown in FIG. 8c at $150^{th}$ cycle, FIG. 8d at $250^{th}$ cycle, FIG. 8e at $350^{th}$ cycle, and FIG. 8f at $500^{th}$ cycle.

Figure 9:
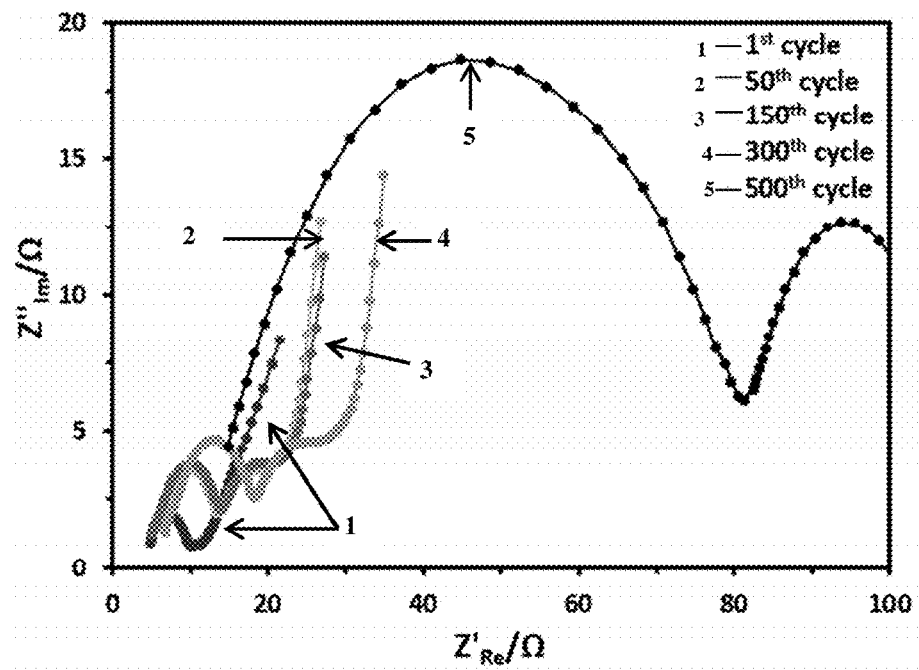
FIG. 9a shows an EUIS analysis of the Li—S cells having the multilayered cathodes of this invention.
FIG. 9b shows an SEM image of the surface of the multilayered cathode of this invention after 500 cycles.
Figure 9:
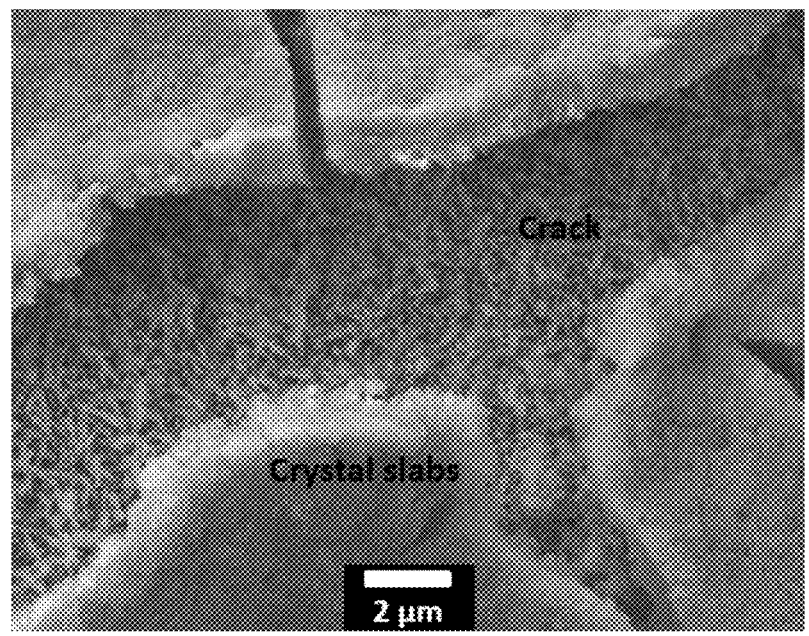

Electrochemical impedance spectra (EIS) analysis was performed to further evaluate the mulilayered cathodes. As shown in FIG. 9a, the EIS spectra comprised of two semicircles at the high frequency region and an inclined tail in the low frequency region. The real axis intercepting at the high frequency represented the electrolyte resistance. The semicircle from high to medium frequency corresponded to the SEI layer resistance, and the second semicircle at medium frequency was related to the charge transfer resistance. The short inclined line in low frequency regions was due to ionic diffusion within the cathode. The interfacial charge-transfer resistance was recognizable from the second semicircle due to the redox formation of soluble polysulfides and insoluble short-chain polysulfides. The resistances at the $50^{th}$ and $150^{th}$ cycles were identical, indicating a stable SEI layer on the lithium surface and a smooth charge transfer of lithium ions in the cell. These findings might indicate that there was little or no polysulfide shuttling in the first 150 cycles since otherwise, the dissolved polysulfides would migrate toward the Li-anode at which point they would be reduced to LPS and irreversibly precipitate onto the Li-anode surface which would inhibit charge transfer of lithium ions thereby leading to an increase in cell impedance. Cathode kinetics and charge-transfer polarization accounted for the majority of the voltage loss in cells. The multilayered cathodes had low resistances, which presented an ideal opportunity to create intimate organic-inorganic interfaces for efficient electrochemical reactions in Li—S batteries. At the $500^{th}$ cycle, by contrast, both the interfacial resistance and charge transfer resistance increased. The reactions of sulfur resulted in great morphological changes at the 500$^{th}$ cycle, leading to (i) obvious cracks and (ii) formation of insulating crystal slabs on the surfaces of the multilayered cathodes (FIG. 9b). Both the nonconductive species and the cracks caused high resistances within the cell. FIG. 9a shows the EIS analysis of the Li—S cells with multilayered cathodes, and FIG. 9b shows SEM image of cathode surface after 500 cycles.

This example provides that a multilayered sulfur composite cathode with high sulfur content of 67.5 wt. % was fabricated using the LbL-assembly method. The interconnected PANI and FCNT layers served as an electrical conductive network and the abundance of pores served as ionic conductive pathways. SEM images indicated sulfur was well distributed in discrete layers before cycling, which enhanced sulfur utilization by providing intimate contacts of sulfur to the highly conductive selected layers. The discharge/charge voltage profiles and the CV scans, combined with the EIS, XPS and FTIR analyses, revealed that the multilayered cathodes were highly efficient in fixing and trapping soluble polysulfides during cell operation. As a result, the multilayered cathodes provided a long lifetime of more than 600 cycles with an average Coulombic efficiency of 97.5% under a variety of discharge/charge current densities. We attributed the high rate capability and cycling stability to the unique multilayered porous structures which provided adequate electron/ion conductive pathways and strong affinity of polysulfides for multilayered framework. This unique composite favored a much more complete sulfur transformation from $S_8$ to $Li_2S$ or $Li_2S_2$ before possible soluble polysulfides could diffuse into electrolyte leading to excellent cell operation with high efficiency, good reversibility, and fast kinetics. SEM images showed no structural damage to the multilayered cathode until the 500$^{th}$ cycle, indicating robust mechanical properties of the multilayered cathode fabricated by the LbL technique. The sulfur confinement mechanisms and structural superiority of the multilayered cathodes were sufficient to retard polysulfide dissolution thereby resulting in long-term cycling stabilities while achieving high capacities with excellent rate capabilities. LbL-fabricated, multilayered cathodes offer great promise for the ubiquitous application of low-cost, long-lived, high energy density, high power Li—S batteries for electric vehicle systems and flexible and thin-film devices.

Methods (1) Materials.

A. Preparation of S-CNT Composites.

Multi-walled carbon nanotubes (CNTs, 110-170 nm in diameter and 5-9 μm in length, Sigma-Aldrich, St. Louis, Mo.) were soaked in nitric acid (70 wt. %) and sulfuric acid (98 wt. %) (v 1:3) in an ultrasonic container for 1 h, kept in an oven of 70° C. for 2 h, and then rinsed with distilled water seven times to get FCNT. The FCNTs were dispersed into sodium dodecyl sulfate (SDS) aqueous solution (Sigma-Aldrich). Meanwhile, sulfur powder (99.98%, Sigma-Aldrich) was dissolved in tetrahydrofuran (THF, Sigma-Aldrich) to form a saturated solution. Next, the sulfur-saturated THF and FCNTs in SDS were mixed for 12 h under magnetic stirring, then centrifuged. The supernatant was decanted and the remaining materials were washed using deionized water three times to remove SDS. Finally, the as-prepared S-CNTs were mixed with sulfur (1:1 wt. %) and treated in a vacuum oven at 159° C. for 8 h then at 300° C. for 1.5 h.

B. Preparation of SPANI.

PANI, sulfur monochloride, and aluminum chloride (99.99%), purchased from Sigma-Aldrich, were soaked in acetonitrile in a sealed flask for 10 h, washed using ether five times, and dried in a vacuum oven at 80° C. for 24 h to obtain chloride PANI. Sulfur and sodium sulfide were then mixed in N,N-dimethylformamide (DMF) in a vacuum oven for 6 h to obtain disodium pentasulfide ($Na_2S_5$). Next, the chloride PANI was soaked in a $Na_2S_5$ solution for 24 h in a vacuum oven, washed with deionized water ten times, and dried in a vacuum oven at 80° C. for 24 h to achieve initial sulfurized PANI. Finally, the initial sulfurized PANI was mixed with sulfur (1:1 wt. %) in carbon disulfide solution ($CS_2$, Sigma-Aldrich) for 2 h under magnetic stirring and heated in a vacuum oven at 280° C. for 2 h to obtain SPANI.

(2) Fabrication of multilayered cathodes using LbL self-assembly technique.

A. Aluminum Substrate Treatment.

In this work, the aluminum current collector was selected as the substrate for the LbL process. First, a thin layer of CNT-COO$^-$ was deposited on the substrate by the electrophoretic deposition (EPD) technique.

B. LbL Process.

First, SPANI was treated with $NH_2OH$ solution at 70° C. for 2 h, and S-CNT was mixed with poly(styrenesulfonate) (PSS, MW ~70,000, Sigma-Aldrich) solution for 2 h. These treated powders were then sonicated for 6 h in deionized water separately to form uniform dispersions. The pH values of both solutions were adjusted to 3.5 and the solutions were sonicated for 3 h before LbL assembly. The purpose of introducing PSS here was to facilitate the growth of the multilayer films via electrostatic interactions. Details of LbL assembly of cathodes can be found elsewhere[29-32]. In brief, the process involves immersing the treated substrate into the SPANI suspension for 3 min and then washing the substrate in deionized water for 30 sec; next, placing the SPANI-coated substrate into S-CNT suspension for 3 min (minutes) and then washing in deionized water for 30 sec (seconds). These steps are repeated until the desired number of layers is achieved. Finally, the assembled multilayered cathodes are dried in air and then treated at 100° C. in a vacuum oven for 5 h. The cathode is now ready to be assembled into a cell.

(3) XPS, XRD, and FTIR Measurements.

Kratos Axis Ultra XPS (Kratos Analytical) with a monochromatized Al Ka X-ray source, PANalytical XRD, and FTS 7000 FTIR were used to analyze the surface chemistry of S-CNT, SPANI, and the multilayered cathodes. Curve fittings of the XPS spectra were performed following a Shirley-type background subtraction. The figures for XRD and FTIR were plotted with Origin using the notable peaks as a reference.

(4) Electrochemical Measurements of Multilayered Cathode-Based Cells.

CR2016-type coin cells were used as the testing cells.— Lithium foils were used as the anodes, Cellgard 2400 microporous membranes as separators, 1.0 molL$^{-1}$ bis(trifluoromethane sulfonyl) imide (LiTFSI) and 0.15 molL$^{-1}$ LiNO$_3$ dissolved in dioxolane (DOL) and dimethoxyethane (DME) (1:1, v/v) as electrolytes, and S-CNT/SPANI multi-layered composite as cathodes. The cells were assembled in an Argon-filled glove box. Electrochemical measurements were performed galvanostatically between 1.0 and 3.0 V at current densities of 550, 1300, 1950, and 6400 mAg$^{-1}$. Capacity was calculated based on the weight of all materials on the cathodes. CV experiments were conducted using a NOVA potentiostat at scan rates of 5, 0.5, and 0.1 mVs$^{-1}$. EIS measurements were carried out using a NOVA electrochemical workstation in a frequency range between 100 kHz and 100 mHz at a potentiostatic signal amplitude of 5 mV. All experiments were conducted at room temperature.

FIG. 10a shows XRD analysis of S-CNT, SPANI and FCNT. The S-CNT has typical sulfur peaks, indicating the uniform deposition of onto CNT surfaces. By comparison, SPANI shows both sulfur and PANI peaks, indicating that sulfur layers do not completely coat the PANI surface. FIG. 10b shows FTIR spectra of S-CNT. All the C—O and C═O peaks of S-CNT are smaller than that of FCNT, indicating the decrease of functional groups after reacting with sulfur. The two additional distinct peaks in the S-CNT between 700 and 1000 indicate C—S bonds. FIG. 10c shows TGA and DSC analysis of S-CNT showing 76.9 wt. % of sulfur in the S-CNT composite. Compared with S/CNT, which here was synthesized using the traditional method of heating a mixture of sulfur and CNT at 159° C. for 10 hours, the S-CNT has a higher decomposition temperature (390° C.) than S/CNT (320° C.), suggesting a promoted affinity and interaction between sulfur and FCNT.

FIG. 11a shows XPS spectra of SPANI. FIG. 11b shows 2p spectra of SPANI. The raw and fitted curves indicate sulfur mainly existed as S—S and C—S forms in SPANI. FIG. 11c shows TGA and DSC analysis of SPANI showing 65.4 wt. % of sulfur in SPANI composite.

Figure 12:
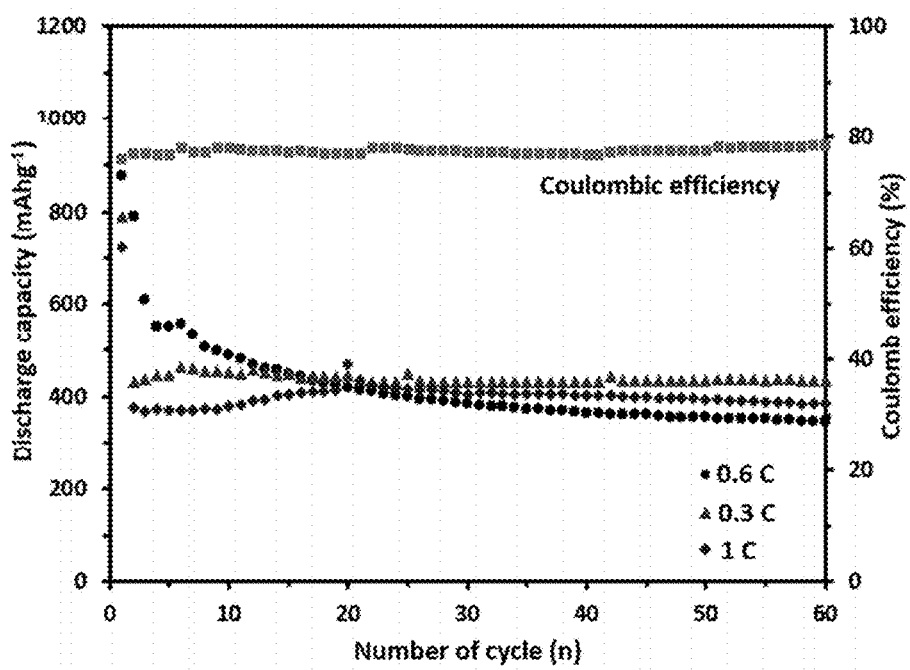
FIG. 12 shows cycling performance at various current densities of the slurry coated cathodes of this invention.

FIG. 12 shows cycling performance at various current densities for the slurry-coated cathodes that contain 10 wt. % of PVDF, 45 wt. % S-CNT and 45 wt. % SPANI. Both the S-CNT and SPANI are the materials used in the multilayered sulfur cathode. There are not any carbon black or other carbon conduct agents. The thickness of the film is about 40 um, which is similar with the thickness of the multilayered film.

FIG. 13 shows CV data of S-CNT and SPANI based cathodes. The scan rate was 0.05 mVs$^{-1}$. The S-CNT based cathodes contained 10 wt. % of PVDF and 90 wt. % of S-CNT; the SPANI based cathodes contained 10 wt. % of PVDF and 90 wt. % of SPANI. Both S-CNT and SPANI show typical sulfur CV peaks. The real line indicate the first cycle, and the dotted line indicate the second cycle of the CV tests.

FIG. 14 shows XRD data of the multilayered cathode after 50$^{th}$ discharge. The cathode was obtained in the glove box and washed by DOL. After drying in the glove box, it was transferred into a sealed oxygen-insulting box for ex-situ XRD testing.

Figure 15:
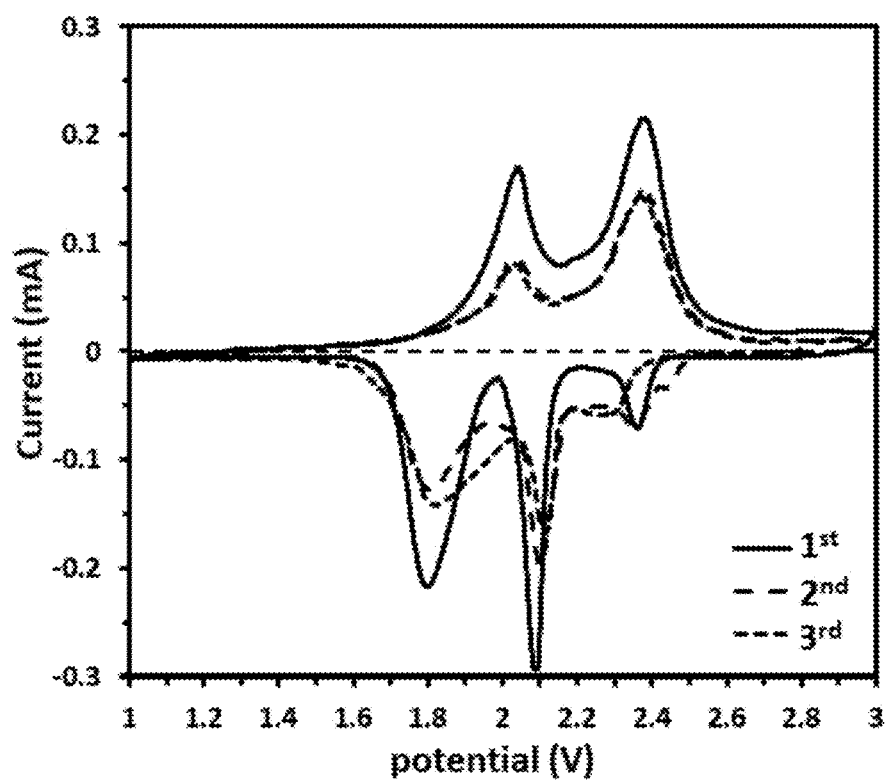
FIG. 15 shows continuous CV scans of the multilayered cathodes of this invention.

FIG. 15 shows continuous CV scans of the multilayered cathodes for the first 3 cycles.

REFERENCE PUBLICATIONS

[*1] Zhang, S. S.; Liquid electrolyte lithium/sulfur battery: fundamental chemistry, problems, and solutions. Journal of Power Sources 231, 2013, 153-162.

[*2] Zhang, S. S.; New insight into liquid electrolyte of rechargeable lithium/sulfur battery. Electrochimica Acta, 2013, 97, 226-230.

[*3] Elazari, R.; Salitra, G.; Talyosef, Y.; Grinblat, J.; Scordilis-Kelley, C.; Xiao, A.; Affinito, J.; and Aurbach, D. Morphological and structural studies of composite sulfur electrodes upon cycling by HRTEM, AFM and □ Raman spectroscopy, Journal of The Electrochemical Society, 2010, 157, A1131-A1138.

[*4] Zheng, J.; Gu, M.; Chen, H.; Meduri, P.; Engelhard, M. H.; Zhang, J.; Liu. J. and Xiao, J. Ionic liquid-enhanced solid state electrolyte interface (SEI) for lithium-sulfur batteries, J. Mater. Chem. A, 2013, 1, 8464.

[*5] Yang, Y.; Zheng, G. Y.; Misra, S.; Nelson, J.; Toney, M. F. and Cui, Y. High-capacity micrometer-sized LiaS particles as cathode materials for advanced rechargeable lithium-ion batteries. J. Am. Chem. Soc., 2012, 134, 15387-15394.

[*6] Wang, Y.; etc. Structural change of the porous cathode using gelatin as a binder during discharge and charge. Electrochim. Acta 2009, 54, 4062.

[*7] Nelson, J.; etc. In operando X-ray diffraction and transmission X-ray microscopy of lithium sulfur batteries, J. Am. Chem. Soc, 2012, 134 (14), 6337.

[*8] Yang, Y.; Zheng, G. Y. and Cui, Y. Nanostructured sulfur cathodes. J. Chem Soc Rev, 2013, 42, 3018.

[1] Bruce, P. G., Freunberger, S. A., Hardwick, L. J., Tarascon, J. M. Li—O$_2$ and Li—S batteries with high energy storage, Nat. Mater. 11, 19 (2012).

[2] Tarascon J. M. and Armand M. Issues and challenges facing rechargeable lithium batteries. Nature 414, 359 (2001).

[3] Yang, Y., Zheng, G. Y. and Cui, Y. Nanostructured sulfur cathodes. J. Chem. Soc. Rev. 42, 3018 (2013).

[4] Whittingham, M. S. Lithium batteries and cathode materials. Chem. Rev. 104, 4271 (2004).

[5] Ellis, B. L.; Lee, K. T.; Nazar, L. F. Positive electrode materials for li-ion and li-batteries. Chem. Mater. 22, 691 (2010).

[6] Zhang, S. S. Liquid electrolyte lithium/sulfur battery: fundamental chemistry, problems, and solutions. J. Power Sources 231, 153-162 (2013).

[7] Zhang, S. S. New insight into liquid electrolyte of rechargeable lithium/sulfur battery. Electrochim. Acta 97, 226 (2013).

[8] Tang C. et al. Nitrogen-doped aligned carbon nanotube/graphene sandwiches: facile catalytic growth on bifunctional natural catalysts and their applications as scaffolds for high-rate lithium-sulfur batteries. Adv. Mater. 26, 6100 (2014).

[9] Zheng G. et al. Amphiphilic surface modification of hollow carbon nanofibers for improved cycle life of lithium sulfur batteries. Nano Lett. 13, 1265 (2013).

[10] Wang Z. et al. Enhancing lithium-sulphur battery performance by strongly binding the discharge products on amino-functionalized reduced graphene oxide. Nat. Comm. 5, 5002 (2014).

[11] Su, Y. and Manthiram, A. Lithium-sulphur batteries with a microporous carbon paper as a bifunctional interlayer. Nat. Comm. 3, 1166 (2012).

[12] Wang, H. et al. Graphene-wrapped sulfur particles as a rechargeable lithium-sulfur battery cathode with high capacity and cycling stability. Nano Lett. 11, 2644 (2011)

[13] Zhang, B., Qin, X., Li, G. R. and Gao, X. P. Enhancement of long stability of sulfur cathode by encapsulating sulfur into micropores of carbon spheres. Energy Environ Sci. 3, 1531 (2010).

[14] Huang, C. et al. Manipulating surface reactions in lithium-sulphur batteries using hybrid anode structures. Nat. Comm. 5, 3015 (2014).

[15] Zheng, G. et al. Interconnected hollow carbon nanospheres for stable lithium metal anodes. Nat. Nanotechnol. 9, 618 (2014).

[16] Suo, L., Hu, Y., Li, H., Armand, M. and Chen L. A new class of solvent-in-salt electrolyte for high-energy rechargeable metallic lithium batteries. Nat. Comm. 4, 1481 (2014).

[17] Elazari, R. et al. Morphological and structural studies of composite sulfur electrodes upon cycling by HRTEM, AFM and Raman spectroscopy. *J. Electrochem. Soc.* 157, A1131 (2010).
[18] Nelson, J. et al. In operando X-ray diffraction and transmission X-ray microscopy of lithium sulfur batteries. *J. Am. Chem. Soc.* 134, 6337 (2012).
[19] Decher, G. Fuzzy nanoassemblies: toward layered polymeric multicomposites. *Science* 277, 29 (1997).
[20] Volder M. F., Tawfick S. H., Baughman R. H., Hart A. J., Carbon nanotubes: present and future commercial applications. *Science,* 339, 535 (2013).
[21] Tasis D., Tagmatarchis N., Bianco A. and Prato M. Chemistry of carbon nanotubes. *Chem. Rev.* 106, 1105 (2006).
[22] Fan Z. et al. A three-dimensional carbon nanotube/graphene sandwich and its application as electrode in supercapacitors. *Adv. Mater.* 22, 3723 (2010).
[23] Guo, J., Xu, Y. and Wang, C. Sulfur-impregnated disordered carbon nanotubes cathode for lithium-sulfur batteries. *Nano Lett.* 11, 4288 (2011).
[24] Chen, J., Jia, X., She, Q., Wang, C., Zhang, Q., Zheng, M., and Dong, Q. The preparation of nano-sulfur/MW-CNTs and its electrochemical performance. *Electrochim. Acta* 55, 8062 (2010).
[25] Xiao, L. et al. A soft approach to encapsulate sulfur: polyaniline nanotubes for lithium-sulfur batteries with long cycle life. *Adv. Mater.* 24, 1176 (2012).
[26] Zhou, W., Yu, Y., Chen, H., Disalvo, F. J. and Abruña, H. D. Yolk-Shell structure of polyaniline-coated sulfur for lithium-sulfur batteries. *J. Am. Chem. Soc.* 135, 16736 (2013).
[27] Zhang, S., Zhang, L., Wang, W. and Xue, W. A Novel cathode material based on polyaniline used for lithium/sulfur secondary battery. *Synthetic Met.* 160, 2041 (2010).
[28] Meyer B. Elemental sulfur. *Chem. Rev.,* 76, 367 (1976).
[29] Lee, S. W. et al. High-power lithium batteries from functionalized carbon-nanotube electrodes. *Nat. Nanotechnol.* 5, 531 (2010).
[30] Li, B. et al. Innovative nano-layered solid sorbents for CO2 capture. *Chem. Commun.* 47, 1719 (2011).
[31] Jiang, B., et al. Performance of amine-multilayered solid sorbents for CO2 removal: Effect of fabrication variables. *Int. J. Greenh Gas Con,* 5, 1170 (2011).
[32] Li, B., Jiang, B., Boyce, B. M., Lindsey, B. A. Multilayer polypeptide nanoscale coatings incorporating IL-12 for the prevention of biomedical device-associated infections. Biomaterials, 30, 2552(2009).

It will be appreciated by those persons skilled in the art that changes could be made to the embodiments described herein without departing from the broad inventive concept thereof. It is understood, therefore, that this invention is not limited to the particular embodiments disclosed, but is intended to cover modifications that are within the spirit and scope of the invention, as defined by the appended claims.

What is claimed is:

1. A multilayered cathode for a lithium sulfur battery comprising:
at least one current collector working electrode having a surface comprising a negatively charged carbon containing layer;
two or more negatively charged sulfur containing layers wherein at least one of said negatively charged sulfur layers is a negatively charged sulfur-polystyrene sulfonate layer that is located in juxtaposition to and in communication with said negatively charged carbon containing layer; and
at least one outermost layer comprising a positively charged polymer that is a polyaniline polymer for forming interconnected layers of said negatively charged sulfur-polystyrene sulfonate layer, said negatively charged carbon containing layer, and said positively charged polyaniline polymer, wherein said outermost layer is in juxtaposition to and in communication with at least one of said negatively charged sulfur layers.

2. The multilayered cathode of claim 1 wherein said negatively charged carbon containing layer comprises a carbon nanotube —COO$^-$ moiety.

3. The multilayered cathode of claim 1 comprising alternatively arranged layers of said negatively charged sulfur containing layers wherein said negatively charged sulfur containing layers comprise one or more negatively charged sulfur containing compounds and one or more negatively charged sulfur-polystyrene sulfonate layers.

4. The multilayered cathode of claim 1 wherein said layers have porous cross-linked structures.

5. The multilayered cathode of claim 1 wherein at least one of said sulfur containing layers is a sulfur-carbon nanotube polystyrene sulfonate polymer.

6. The multilayered cathode of claim 1 wherein said outermost layer of said positively charged polyaniline polymer is a sulfur polyaniline polymer.

7. A lithium sulfur battery having at least one multilayered cathode and at least one anode, wherein said multilayered cathode comprises at least one current collector working electrode having a surface comprising a negatively charged carbon containing layer; two or more negatively charged sulfur containing layers wherein at least one of said negatively charged sulfur layers is a negatively charged sulfur-polystyrene sulfonate layer that is located in juxtaposition to and in communication with said negatively charged carbon containing layer; and at least one outermost layer comprising a positively charged polymer that is a polyaniline polymer for forming interconnected layers of said negatively charged sulfur-polystyrene sulfonate layer, said negatively charged carbon containing layer, and said positively charged polyaniline polymer, wherein said outermost layer is in juxtaposition to and in communication with at least one of said negatively charged sulfur layers.

8. The lithium sulfur battery of claim 7 wherein said negatively charged carbon containing layer of said multilayered cathode comprises a carbon nanotube —COO$^-$ moiety.

9. The lithium sulfur battery of claim 7 wherein said multilayered cathode comprises alternatively arranged layers of said negatively charged sulfur containing layers wherein said sulfur containing layers comprise one or more negatively charged sulfur containing compounds and one or more negatively charged sulfur-polystyrene sulfonate layers.

10. The lithium sulfur battery of claim 7 wherein said layers of said multilayered cathode have porous cross-linked structures.

11. The lithium sulfur battery of claim 7 wherein at least one of said negatively charged sulfur containing layers of said multilayered cathode is a sulfur-carbon nanotube polystyrene sulfonate polymer.

12. The lithium sulfur battery of claim 7 wherein said outermost layer of said positively charged polyaniline polymer of said multilayered cathode is a sulfur polyaniline polymer.

13. A method of making a multilayered cathode for a lithium sulfur battery comprising:
   (a) providing a sulfur carbon nanotube polystrenesulfonate composition dispersed in water for forming a sulfur carbon nanotube polystyrene dispersion;
   (b) providing a sulfurized polyaniline composition dispersed in water for forming a sulfurized polyaniline dispersion;
   (c) providing a current collector having a surface comprising a carbon coating;
   (d) immersing said current collector having said carbon coating into said sulfurized polyaniline dispersion to form a sulfurized polyaniline coated current collector; and
   (e) immersing said sulfurized polyaniline coated current collector into said sulfur carbon nanotube polystyrene dispersion for forming one layer of said sulfurized polyaniline and said sulfur carbon nanotube polystyrenesulfonate treated current collector; and
   (f) repeating said steps (d) and (e) one or more times to form one or more additional layers of said sulfurized polyaniline and said sulfur carbon nanotube polystyrenesulfonate upon said treated current collector.

14. The method of claim 13 wherein said carbon coating comprises one or more of a functionalized porous carbon, graphite, grapheme, carbon nanoparticles, carbon nanotubes, carbon fibers, and carbon rods.

15. The method of claim 13 wherein said functionalized porous carbon is a carbon nanotube functionalized with a $COO^-$ group to form a carbon nanotube $COO^-$.

16. The method of claim 13 wherein said current collector is one or more selected from the group consisting of an aluminum substrate, a copper substrate, a nickel substrate, and a conductive glass.

\* \* \* \* \*